(12) United States Patent
Milazzo et al.

(10) Patent No.: US 11,138,284 B2
(45) Date of Patent: Oct. 5, 2021

(54) SYSTEMS AND METHODS FOR DETERMINING CREDIBILITY AT SCALE

(71) Applicant: Trustie Inc., Saratoga, CA (US)

(72) Inventors: Cedar Woodchopper Milazzo, Saratoga, CA (US); Jacob Bailly, Frisco, TX (US); Nameer Hirschkind, Kensington, CA (US); Elizabeth Earle, Sacramento, CA (US)

(73) Assignee: Trustie Inc., Saratoga, CA (US)

( * ) Notice: Subject to any disclaimer, the term of this patent is extended or adjusted under 35 U.S.C. 154(b) by 71 days.

(21) Appl. No.: 16/540,015

(22) Filed: Aug. 13, 2019

(65) Prior Publication Data

US 2020/0073902 A1 Mar. 5, 2020

Related U.S. Application Data

(60) Provisional application No. 62/764,598, filed on Aug. 13, 2018.

(51) Int. Cl.
*G06F 16/95* (2019.01)
*G06F 16/9538* (2019.01)
*G06F 16/9536* (2019.01)
*G06Q 30/02* (2012.01)
*G06F 16/332* (2019.01)
*G06F 40/30* (2020.01)

(52) U.S. Cl.
CPC ...... *G06F 16/9538* (2019.01); *G06F 16/3328* (2019.01); *G06F 16/9536* (2019.01); *G06F 40/30* (2020.01); *G06Q 30/0263* (2013.01)

(58) Field of Classification Search
CPC ............ G06F 16/9538; G06F 16/3328; G06F 16/9536; G06F 40/30
See application file for complete search history.

(56) References Cited

U.S. PATENT DOCUMENTS

| | | | |
|---|---|---|---|
| 10,162,900 B1* | 12/2018 | Chatterjee | G06F 16/248 |
| 2013/0159325 A1* | 6/2013 | Polonsky | G06F 16/335 |
| | | | 707/754 |
| 2018/0204111 A1* | 7/2018 | Zadeh | G06K 9/3233 |
| 2020/0073902 A1* | 3/2020 | Milazzo | G06F 16/3328 |

* cited by examiner

*Primary Examiner* — David E Choi
(74) *Attorney, Agent, or Firm* — Ahmann Kloke LLP

(57) ABSTRACT

An example system may include instructions to control processor(s) to receive text from content of a first web page, determine, based on the content, a first title topic indicator, a first sentiment indicator, and a first text subjectivity indicator, apply the first title topic indicator, the first sentiment indicator, and the first text subjectivity indicator to a credibility machine learning model to generate a first content credibility score and a first content bias score for the text of the first web page, the credibility machine learning model being trained on text from other web pages using known title topic indicators, known sentiment indicators, and known text subjectivity indicators, and known credibility scores and bias scores, generate a first graphical representation for the first content credibility score and the first bias credibility score, and provide the graphical representation to a first digital device.

18 Claims, 10 Drawing Sheets

SYSTEMS AND METHODS FOR DETERMINING CREDIBILITY AT SCALE

CROSS-REFERENCE TO RELATED APPLICATIONS

The present application claims the benefit of U.S. Provisional Patent Application Ser. 62/764,598, filed Aug. 13, 2018 and entitled "Systems and Methods for Determining Trustworthiness of a Textual Article," which is hereby incorporated by reference herein.

TECHNICAL FIELD

This disclosure pertains to systems for determining credibility for text in web pages by leverage machine learning models to identify credibility based on language usage and, more specifically, determining credibility for text in web pages based on language usage to enable determining credibility at scale to a variety of different requestors across one or more networks.

BACKGROUND

As the Internet becomes more ubiquitous, people are increasingly relying on Internet sites for information and news. The number of different websites that provide information is constantly expanding at an increasing rate. Websites that provide information are not limited to news sites, however. People are receiving information from social media platforms, independent websites, bulletin boards, community sites, and many other sources.

It is commonly understood, however, that information from the Internet can be less than trustworthy. Many individuals that provide information may be creating misleading information, partial truths, and/or falsehoods to promote beliefs, political platforms, desired medical results, worldviews, hate, confusion, or simply create discord. For example, as political discourse continues to degrade, there is an increasing amount of information designed to falsely promote one view or denigrate another in a fiercely partisan environment.

To combat this problem, some websites have promoted fact checking of various articles and beliefs in order to help people understand what is false. The problem with the systems, unfortunately, is that they are not scalable and take considerable time. As a result, these systems cannot keep up with the vastly increasing amount of misinformation being provided from an increasing number of websites.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computing system may include: one or more processors, and memory storing instructions that, when executed by the one or more processors, cause the computing system to: receive text from content of a first web page at a first web site, determine a first title topic indicator based on the content of the first webpage, the first title topic indicator indicating a relationship between words in a title within the content of the first web page and text of a body in the content of the first web page, determine a first sentiment indicator based on the content of the first webpage, the first sentiment indicator indicating a degree of sentiment of the body of the content of the first web page, determine first text subjectivity indicator based on the content of the first webpage, the first text subjectivity indicator indicating subjectivity by comparing words and phrases from the content of the first web page to a database of known words and known phrases including known sentiment measures, the first text subjectivity indicator being based on the known sentiment measures, apply the first title topic indicator, the first sentiment indicator, and the first text subjectivity indicator to a credibility machine learning model to generate a first content credibility score and a first content bias score for the text of the first web page, the credibility machine learning model being trained on text from other web pages using known title topic indicators, known sentiment indicators, and known text subjectivity indicators, and known credibility scores and bias scores, generate a first graphical representation for the first content credibility score and the first bias credibility score indicating degrees of credibility and bias of the content of the first web page, respectively, and provide the graphical representation to a first digital device that navigated to the first web page at the first website. Other embodiments of this aspect include corresponding computer systems, apparatus, and computer programs recorded on one or more computer storage devices, each configured to perform the actions of the methods.

In various embodiments, the instructions may further cause the computing system to: receive text from content of a second web page at a second web site, the second web site being served by a second web server that is remote from a first web server that serves the first website, determine a second title topic indicator based on the content of the second webpage, the second title topic indicator indicating a relationship between words in a title within the content of the second web page and text of a body in the content of the second web page, determine a second sentiment indicator based on the content of the second webpage, the second sentiment indicator indicating a degree of sentiment of the body of the content of the second web page, determine second text subjectivity indicator based on the content of the second webpage, the second text subjectivity indicator indicating subjectivity by comparing words and phrases from the content of the second web page to the database of known words and known phrases including known sentiment measures, the second text subjectivity indicator being based on the known sentiment measures, apply the second title topic indicator, the second sentiment indicator, and the second text subjectivity indicator to the credibility machine learning model to generate a second content credibility score and a second content bias score for the text of the second web page, generate a second graphical representation for the second content credibility score and the second bias credibility score indicating degrees of credibility and bias associated with the content of the second web page, respectively, and provide the graphical representation to a second digital device that navigated to the second web page at the second website.

The instructions may further cause the computing system to retrieve text from the content of the first web page, where the first title topic indicator, the first sentiment indicator, and the first text subjectivity indicator are determined based on the text of the content of the first web page. The instructions may further cause the computing system to perform natural language processing on the text to, in part, identify sentences within the content of the first web page. Determining the text subjectivity indicator may include determining a measure of subjectivity for each of a plurality of sentences in the content of the first web page and the determining the text subjectivity indicator by averaging the measure of subjectivity for each of the plurality of sentences.

The instructions may further cause the computing system to the computing system to perform optical character recognition to convert at least a portion of the content of the first web page into text.

In some embodiments, instructions may further cause the computing system to: receive a request from a third digital device, the request including a third web page identifier that identifies a third web page, if the system has previously stored a third content credibility score associated with the third web page, then provide the credibility score to the third digital device, and if the system has not previously stored a third content credibility score associated with the third web page, then: receive text from content of the third web page at a third website, determine a third title topic indicator based on the content of the third webpage, the third title topic indicator indicating a relationship between words in a title within the content of the third web page and text of a body in the content of the third web page, determine a third sentiment indicator based on the content of the third webpage, the third sentiment indicator indicating a degree of sentiment of the body of the content of the third web page, determine third text subjectivity indicator based on the content of the third webpage, the third text subjectivity indicator indicating subjectivity by comparing words and phrases from the content of the third web page to the database of known words and known phrases including known sentiment measures, the second text subjectivity indicator being based on the known sentiment measures, apply the third title topic indicator, the third sentiment indicator, and the third text subjectivity indicator to the credibility machine learning model to generate a third content credibility score, store the third credibility score associated with the third web page, receive a request from a fourth digital device, the requesting including the third web page identifier that identifies the third web page, and provide the third credibility score associated with the third web page to the fourth digital device. Instructions may further cause the computing system to provide the third credibility score associated with the third web page to the third digital device.

Instructions may further cause the computing system to provide the third digital device an indication that the third web page has not been previously assessed. The third digital device may be an advertisement server that may selects advertisements to be served to the third web page and the request including the third web page identifier is sent to the system prior to the advertisement server providing an advertisement to the third web page. Implementations of the described techniques may include hardware, a method or process, or computer software on a computer-accessible medium.

One general aspect includes a non-transitory computer readable medium including instructions that, when executed, cause one or more processors to perform: receiving text from content of a first web page at a first web site, determining a first title topic indicator based on the content of the first webpage, the first title topic indicator indicating a relationship between words in a title within the content of the first web page and text of a body in the content of the first web page, determining a first sentiment indicator based on the content of the first webpage, the first sentiment indicator indicating a degree of sentiment of the body of the content of the first web page, determining first text subjectivity indicator based on the content of the first webpage, the first text subjectivity indicator indicating subjectivity by comparing words and phrases from the content of the first web page to a database of known words and known phrases including known sentiment measures, the first text subjectivity indicator being based on the known sentiment measures, applying the first title topic indicator, the first sentiment indicator, and the first text subjectivity indicator to a credibility machine learning model to generate a first content credibility score and a first content bias score for the text of the first web page, the credibility machine learning model being trained on text from other web pages using known title topic indicators, known sentiment indicators, and known text subjectivity indicators, and known credibility scores and bias scores, generating a first graphical representation for the first content credibility score and the first bias credibility score indicating degrees of credibility and bias of the content of the first web page, respectively, and providing the graphical representation to a first digital device that navigated to the first web page at the first website.

Other embodiments of this aspect include corresponding computer systems, apparatus, and computer programs recorded on one or more computer storage devices, each configured to perform the actions of the methods.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIG.s. It is to be expressly understood, however, that the drawings are for purposes of illustration and description only and are not intended as a definition of the limits of the invention.

DETAILED DESCRIPTION

Figure 1:
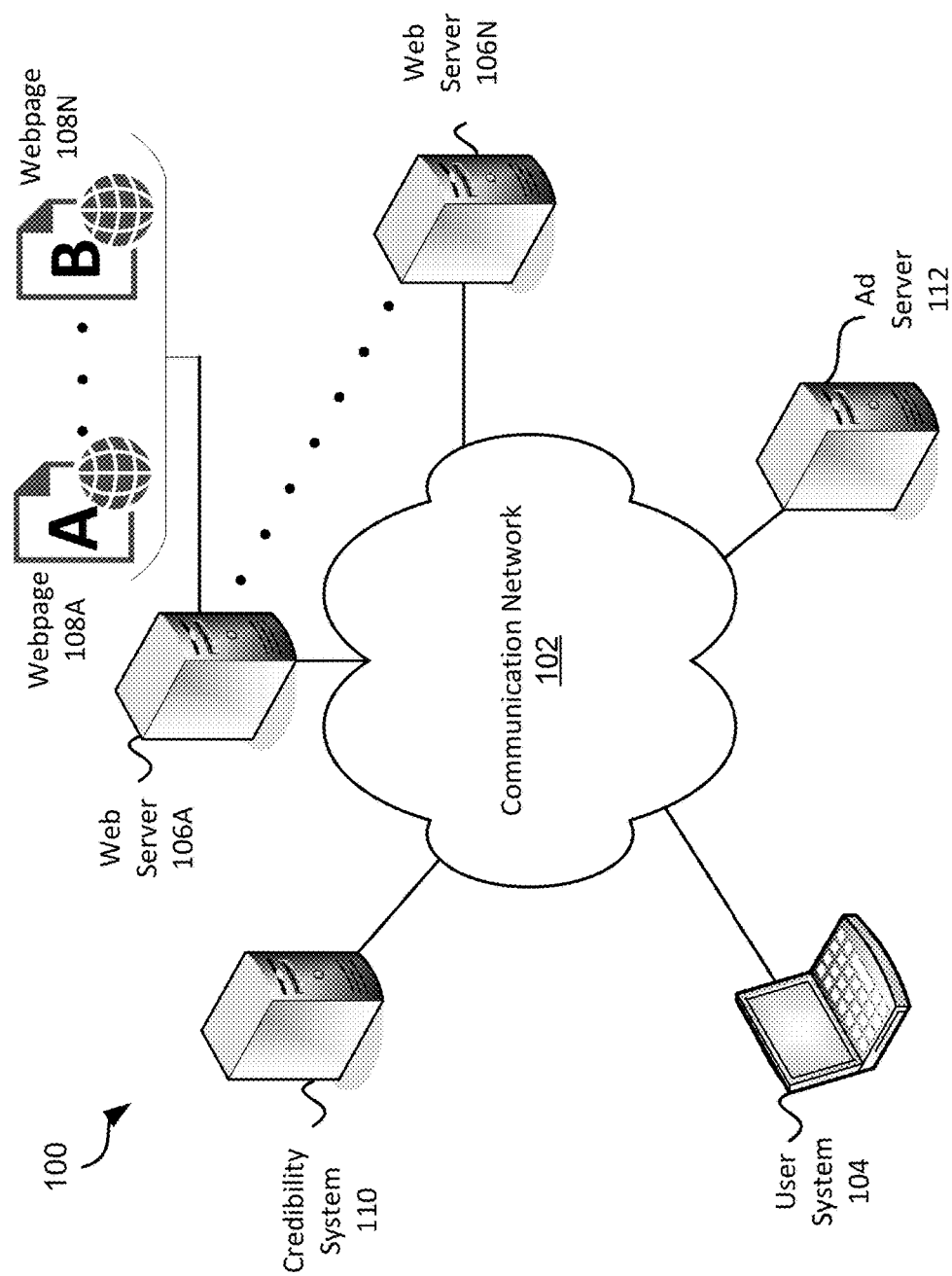
FIG. 1 is an illustration of an environment for assessing credibility of articles and providing content indications in some embodiments.

In various embodiments, a credibility system utilizes machine learning to analyze text of an article (e.g., content of a web page) or other information to identify and score credibility. The credibility system may assess information, articles, or portions of content of webpages in real-time in order to enable a user to make better decisions on whether to read or engage with article.

The credibility system may provide the results as simple icons (e.g., colorful hands, dials, and/or the like) to convey credibility information or a degree of credibility. In one example, the credibility system presents results with simple icons to let a user know if the information is likely credible news or if the article's content is questionable. In some embodiments, the credibility system may provide scores of credibility without providing icons, graphs, or the like.

In various embodiments, the credibility system may provide credibility scores regarding content of any number of webpages. The credibility system may allow users to assess the quality of the credibility score respective to the associated article. This feedback may be utilized to improve the machine learning process. In some embodiments, the credibility system may utilize certified reviewers such as journalists, English language professionals, and/or other individuals with deep knowledge of news and rhetoric. These experts may possess a wide range of backgrounds and diverse viewpoints. Collectively, they may support the training and verification data from machine learning model. The machine learning engine may analyze each article based on objective evidence rather than any individual's subjective opinion.

The machine learning engine may utilize training and verification data from the experts' panel. The machine learning engine may, for example, create a mathematical model based on rhetorical devices and structure for each article that is in the initial corpus. The mathematical model may be utilized to assess articles and provide scoring which may then be reviewed by the experts' panel for correctness.

The credibility engine may utilize natural language processing, machine learning and a proprietary database to assess the text of news articles in real-time. By leveraging the insights gained from delivering credibility scores, the credibility engine may be able to offer a scalable, low-latency, reasonably accurate news article rating tool for ad distribution networks. This process may enable brands to avoid questionable content and favor credible content. Readers may dwell on a credible article longer, in a better frame of mind, and improve ad response.

Further, the system may enable brands to be protected because the brands may be negatively impacted by being displayed next to or in apparent support of a negative, misleading news article. For example, a service or luxury good may be denigrated if advertisements for that service or luxury good appears alongside an outrageous, false, and misleading article. Further, a brand may simply not want to be associated with an article that is otherwise from a trustworthy site but is very high in rhetoric and/or is extremely partisan.

FIG. 1 is an illustration of an environment 100 for assessing credibility of articles and providing content indications in some embodiments. The environment 100 includes a user system 104, web servers 106A-N, web pages 108A-108N, credibility system 110, and advertisement server 112 that communicate over a communication network 102.

The communication network 102 may be any network that allows digital devices to communicate. The communication network 102 may be the Internet and/or include LAN and WANs. The communication network 102 may support wireless and/or wired communication. It will be appreciated that any number of communication paths within the communication network 102 may be encrypted and/or otherwise secured.

The user system 104 may be any digital device with memory at least one processor. In various embodiments, the user system 104 may be any number of computers, laptops, smart phones, tablets, mobile devices, personal computers, servers, and/or the like. Although only one user system 104 is depicted in FIG. 1, it will be appreciated that there may be any number of user systems 104 controlled by any number of users.

The web server 106A may be any digital device and memory at least one processor configured to provide or serve webpages (e.g., webpages 108A-108N). The web server 106A may be a device that maintains one or more pages on the World Wide Web. There may be any number of Web servers 106A through 106N serving similar or different webpages. A webpage is a document (e.g., a hypertext document) that may contain text, audio, video, animations, pictures, and/or any other kind of media. There may be any number of webpages 108B through 108N.

In one example, the user system 104 may utilize a browser to navigate to one or more webpages on one or more web servers (e.g., web servers 106A through 106N). Each webpage may contain content. The content of each webpage may include text or media may be converted into text (e.g., an image depicting text or a PDF). A webpage may also include banners, borders, advertisements, links, and the like that may or may not be related to text depicted in the webpage.

The credibility system 110 may be configured to retrieve or convert text from a webpage 108A and assess all or a portion of the text to provide information regarding credibility. For example, the credibility system 110 may receive text, assess the text, and provide credibility scoring. The text may be from a variety of sources including, for example, webpages, documents, articles, and/or the like. In assessing text, the credibility system may utilize natural language processing (NLP) on all or some of the received text. The credibility system may then score the processed language of the received text. In one example, the credibility system may assess the processed language of the received text to compute a credibility score, a sentiment score, and/or a bias score.

The advertisement (ad) server 112 may be any digital device with memory and a processor configured to make decisions about what advertisements to show on a webpage and then serving those advertisements. The ad server 112 may collect and report data such as impression clicks and the like for advertisers to gain insights from and monitor the performance of the ads. In various embodiments, code on a webpage may include linker code that sends an advertiser request to the ad server 112. The ad server 112 may choose an advertisement campaign based on the information about the webpage and/or the user that navigated to the webpage. The ad server 112 may provide a tag to the webpage to display the selected advertisement.

In one example, the ad server 112 may receive a request for an advertisement from a webpage and may select an advertisement for that webpage based on any number of criteria. The ad server 112 may, for example, based on the webpage, criteria provided by the advertisement publisher, criteria provided by a brand that provided the advertisement, cost and/or profit associated with an advertisement, and the like.

In some embodiments, when a request for an advertisement is received from a web server 106A, the ad server 112 may provide a webpage identifier and/or a portion of the content to the credibility system 110. The credibility system 110 may score credibility of all or a portion of the text content of the webpage and provide one or more credibility scores to the ad server 112. The ad server 112 may select one or more advertisements to be displayed on the webpage based on the credibility scores. For example, some brands may demand that their advertisements only be displayed on webpages with high credibility scores (e.g., credibility scores over a brand's credibility score threshold). The ad server 112 may be incentivized to only display those advertisements on webpages with high credibility scores particularly if a brand is willing to spend more for the service of advertisement placement if the content of the webpages displaying their advertisements are considered to be sufficiently credible.

NLP may encode a document into a feature space. Typically, a parser using NLP may process each word individually, however, there are some domain-specific words that might be domain-specific that the parser may consider to be different words (e.g., "back pain" may be considered as "back" and "pain"). "Back pain" may carry specific meaning. In many NLP applications, separation of these terms may not affect the function of machine learning, however, in some cases it may be critical.

It will be appreciated that the credibility score and the bias score of content of a webpage may be based on analysis of language usage in the content. As such, the credibility system 110 may serve a variety of different user devices that navigate a variety of different web servers providing any number of web pages. Unlike fact checking, which is difficult to do at scale and in a timely matter, in some embodiments, the credibility system 110 may assess content of any number of web pages for language usage in order to determine a credibility score and/or a bias score.

It will be further appreciated that the credibility system 110 may assess content of any number of web pages and provide the results to users at user devices and provide scores to any number of advertisement servers to enable them to provide different advertisements to different web pages.

It will be further appreciated that the system may manage multiple requests from a variety of sources regarding any number of web pages thereby enabling credibility scoring at scale for a variety of unrelated requestors in real-time.

Figure 2:
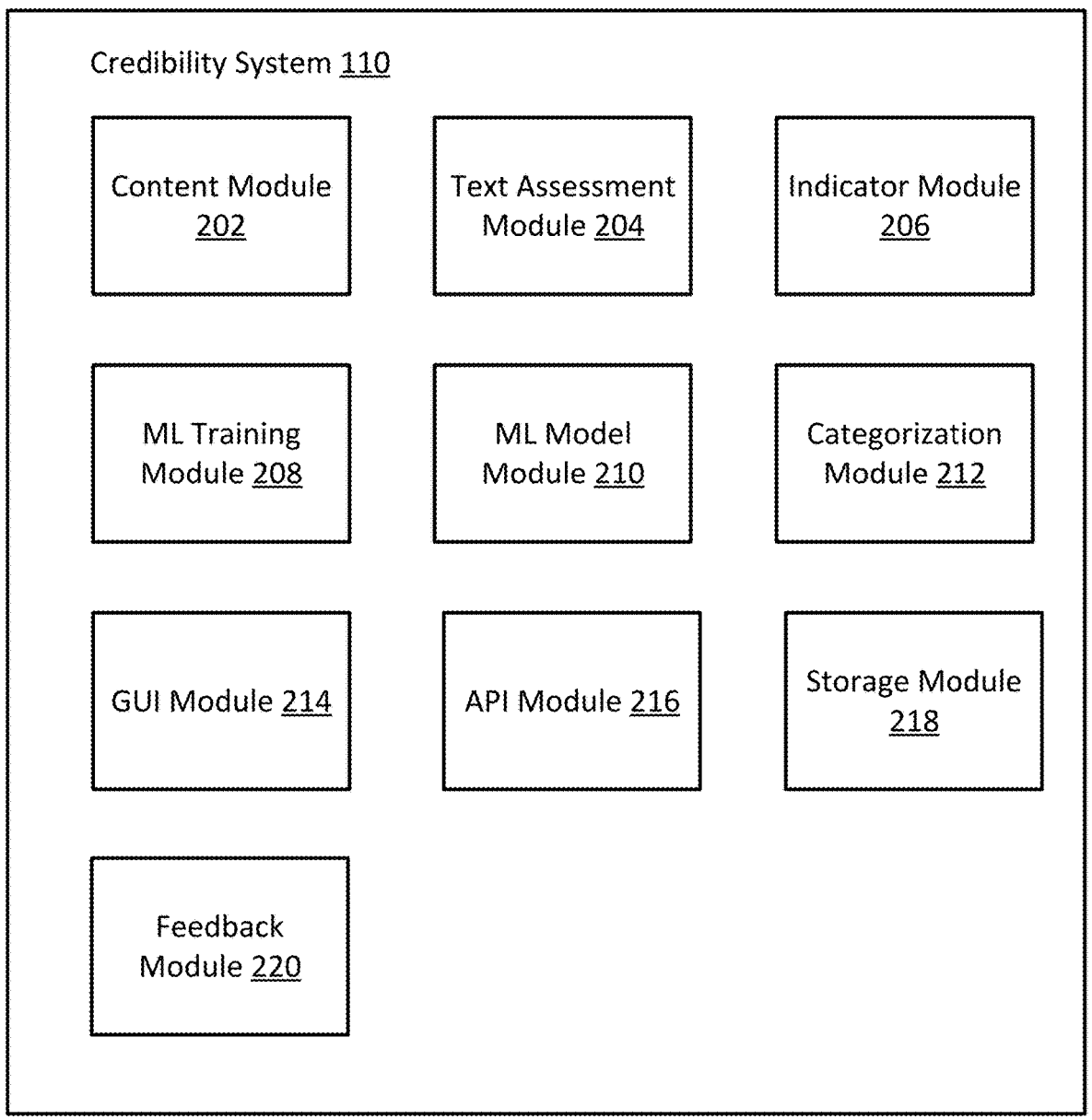
FIG. 2 depicts an example credibility system in some embodiments.

FIG. 2 depicts an example credibility system 110 in some embodiments. The credibility system 110 may include a content module 202, the text assessment module 204, an indicator module 206, a machine learning and training module 208, a machine learning model module 210, a categorization module 212, a GUI module 214, an API module 216, a storage module 218, and the feedback module 220.

The content module 202 may be configured to receive or retrieve text from a webpage. In one example, the content module 202 may receive text from a webpage from the user system 104 or may receive a webpage identifier or article identifier. The webpage identifier or article identifier may include a location such as URL or any other identifying information. In some embodiments, the content module 202 may navigate to the identified webpage. The content module 202 may retrieve all or some of the text of content associated with that webpage.

It will be appreciated that, in some embodiments, the content module 202 may process information from the webpage. For example, the content module 202 may utilize optical character recognition or convert media of the webpage into text.

In some embodiments, the content module 202 may identify the article of the webpage and disregard footers, banners, advertisements, unrelated tables, sponsored unrelated content, links, and/or the like.

The text assessment module 204 may utilize natural language processing (NLP) on the text of the article. Many different NLP applications may be used. In one example, the text assessment module 204 may utilize the natural language toolkit (NLTK).

The text assessment module 204 may utilize NLP to read, decipher, understand, and make sense of text in the article. The text assessment module 204 may parse words, phrases, and sentences from the content of the article to provide meaning. The text assessment module 204 may utilize pattern matching and/or parsers to decompose sentence structure, phrases and words to assist in identifying phrasal components, extract local dependencies. In various embodiments, the text assessment module 204 may utilize full sentence parsing, construction of semantic trees through parsing and grammar, and/or the like.

The indicator module 206 may be configured to calculate any number of indicators that may be used in conjunction with one or more machine learning models to generate credibility, bias, and sentiment scores.

In some embodiments, credibility is assessed on a continuum between credible and questionable. For example, a credible article may demonstrate high journalistic standards, does not show bias, and conveys truthful information. A questionable article may lack references to sources, data, expert quotes, or has not been fact-checked. A questionable article may convey false information and it may be a clickbait article. It most likely does not adhere to the standards of journalistic writing.

Bias may be assessed on a continuum between impartial and biased. For example, an impartial article may present facts supported by evidence and quotes from outside, credible sources. An impartial article may avoid partisan language and makes an effort to account for both sides of an issue, a balance of positive and negative. Biased articles often favor or oppose a subject. Biased articles may contain relevant facts but are primarily focused on convincing the reader to believe in a particular way.

Sentiment may be assessed on a continuum between emotional and unemotional (e.g., objective). For example, articles that are objective may use measured terms to describe events and avoid the use of dramatic or sensational language. Articles that are emotional may include language that is provocative, sensational or even vulgar. Some hallmarks of emotional articles include the use of all caps or the use of positive or negative adjectives to evoke strong feelings in the reader.

Each indicator is calculated based at least in part on content of the text of an article. In one example, an article is any amount of text that is retrieved or converted from a webpage. In other examples, an article may be any document or media that contains text. There may be any number of indicators generated by the indicator module 206.

Indicators may be determined and/or calculated from the text of the content of the article. There may be any number of credibility indicators. In some embodiments, the following indicators may be utilized:

1. Number of quotes indicator
2. Sentiment indicator
3. Title subjectivity indicator 4. Text subjectivity indicator
5. Title topic indicator
6. Frequency of all caps indicator
7. Title caps indicator
8. Adverb count indicator
9. Hate speech indicator
10. Hyper-partisan content indicator
11. Calls to action indicator
12. Adjective polarity indicator
13. Clickbait indicator The number of quotes indicator may indicate a number of quotes or a number of pairs of quotes detected in the text content of the article. An article may include any amount of text from a webpage, document, file, or the like. In various embodiments, the indicator module 206 may scan the text (e.g., the processed text from the NLP engine) to determine a number of quotes or numbers of pairs of quotes. In some embodiments, quotes may indicate a reference to another source such as an article, book, website, or person.

In various embodiments, the text assessment module 204 may utilize NLP (e.g., such as the NLKT) to determine the number of quotes in the text of the article and calculate the number of quotes indicator. In various embodiments, the text assessment module 204 and/or the indicator module 206 may normalize the number of quotes to a value between −1 to 1 although it will be appreciated that any range may be used (e.g., 0 to 1).

The sentiment indicator may indicate a degree and/or type of sentiment. In various embodiments, the indicator module 206 may determine any number of text sentiment indicators for text in the article. In one example, the text assessment module 204 may parse all or some of the text of the article into sentences. The indicator module 206 may determine a text sentiment indicator for each sentence.

In various embodiments, the machine learning training module 208 may train a machine learning sentiment model to assist in determination of text sentiment indicators. For example, the machine learning training module 208 may utilize a database that associates words, phrases, syntax, grammar, sentences, paragraph, context, themes, subthemes, and/or the like with different indications of sentiment. Such a database may include, for example, a sentiment database provided by KAGGLE, an online community for data scientists and machine learners known for fostering competitions for artificial intelligence.

The machine learning training module 208 may also train the machine learning sentiment model based on known content/articles that may or may not be associated with known sentiment indicators. In one example, an expert panel (e.g., of linguists, journalists, language professionals, editors, and the like), may assess a corpus of articles and grade the article (e.g., each sentence, unit, portion, paragraph, and/or the like). The corpus and/or the associated sentiment indicators may be used to train the machine learning sentiment model.

For example, the machine learning training module 208 may utilize a portion of the sentiment database (e.g., from KAGGLE) as well as corpus and indicators from the expert panel to train the machine learning sentiment model.

Many different machine learning models may be trained and utilized. In one example, a neural network and/or a long short-term memory unit (LSTM) is trained and utilized. The LSTM may be a variation of a recurrent neural network. In some embodiments, the machine learning training module 208 utilizes all or some of a sentiment database (e.g., from KAGGLE) as well as corpus and indicators from the expert panel to train the LSTM (e.g., termed herein as the "sentiment LSTM"). In some embodiments, the machine learning training module 208 may utilize a first portion of the sentiment database, corpus, and indicators from the expert panel to train the sentiment LSTM and a second portion of the sentiment database, corpus, and indicators from the expert panel to test the sentiment LSTM.

It will be appreciated that the text assessment module 204 may parse some or all of the text of the article into limited units or portions (e.g., sentences, strings of characters, sets of words, phrases, numbers, and/or the like). The indicator module 206 may determine a text sentiment indicator for each unit or portion.

In some embodiments, the indicator module 206 may determine a quote sentiment for each quote in the text of the article. In various embodiments, the text assessment module 204 may identify quotes in the text of the article through syntax (e.g., by utilization of NLP processing), and the indicator module 206 may determine a quote sentiment indicator for each of the quotes. The indicator module 206 may utilize the same machine learning sentiment model to determine text sentiment indicators as well as quote sentiment indicators.

The title subjectivity indicator may indicate a measure of subjectivity in the title of the content of the article. In various embodiments, text assessment module 204 may utilize NLP (e.g., the NLTK) to identify subjectivity for each word, phrase, or the like in the title of the content of the article. In some embodiments, the indicator module 206 may determine a subjectivity score (e.g., utilizing NLP) for every word and/or phrase in the title of the content of the article. The indicator module 206 may normalize each of the subjectivity scores and then average (e.g., take the mean) of the normalized subjectivity score to generate the title subjectivity indicator.

In some embodiments, the indicator module 206 may weigh the subjectivity score based on the subjectivity scores of the title. For example, the indicator module 206 may scale the subjectivity scores and/or the title subjectivity indicator based on average subjectivity scores in the title (e.g., if above a first threshold, the indicator module 206 may scale the title subjectivity indicator more highly and/or if below a second threshold, the indicator module 206 may lower or provide a weight to lower the title subjectivity indicator).

The indicator module 206 may normalize the measure such that the subjectivity score is converted to a title subjectivity indicator to between a range (e.g., −1 to 1 or 0 to 1).

The text subjectivity indicator may indicate a measure of subjectivity in the text of the content of the article. In various embodiments, text assessment module 204 may utilize NLP (e.g., the NLTK) to identify subjectivity for each word, phrase, or the like in the text of the content of the article. In some embodiments, the indicator module 206 may determine a subjectivity score (e.g., utilizing NLP) for every word and/or phrase in the text of the content of the article. The indicator module 206 may normalize each of the subjectivity scores and then average (e.g., take the mean) of the normalized subjectivity score to generate the title subjectivity indicator.

In some embodiments, the indicator module 206 may provide weigh the subjectivity score based on the subjectivity scores of the text. For example, the indicator module 206 may scale the subjectivity scores and/or the text subjectivity indicator based on the average subjectivity scores in the text (e.g., if above a first threshold, the indicator module 206 may scale the title subjectivity indicator more highly and/or if below a second threshold, the indicator module 206 may lower or provide a weight to lower the title subjectivity indicator).

The indicator module 206 may normalize the measure such that the subjectivity score is converted to a text subjectivity indicator to between a range (e.g., −1 to 1 or 0 to 1).

The title topic indicator may indicate a relationship between keywords and/or phrases in the title and keywords and/or phrases in the body. In various embodiments, the text assessment module 204, utilizing NLP, identifies keywords and phrases in the title of the article and the body of the article. The indicator module 206 may determine which keywords and/or phrases are important in the body of the article and determine similarity with words and/or phrases of the title of the article. the indicator module 206 may utilize a term frequency-inverse document frequency (TF-IDF) to determine important words and/or phrases in the body of the document to compare to words and/or phrases in the title.

In various embodiments, the indicator module 206 applies dimensionality reduction to reduce the number of data features (e.g., the number of dimensions) in the data set calculated using TF-IDF to identify principal components. LSA attempts to find similarities in the domains of words. In the representation used by LSA, a document is seen as an unordered collection of words, and the matrix of words versus documents may be analyzed with SVD, so that information may be sorted into implicit categories. SVD allows an exact representation of any matrix, and also may eliminate less important parts of that representation to produce an approximate representation with any desired number of dimensions.

In some embodiments, the indicator module 206 may take a cosine to compute a Euclidean distance (i.e., a TF-IDF cosine score using TF-IDF of the title and the body of the article) to determine a measure.

The indicator module 206 may normalize the measure such that the measure is converted to a title topic indicator to between a range (e.g., −1 to 1 or 0 to 1).

The frequency of all caps indicator may indicate a frequency of words, phrases, or the like in the article (e.g., body, title, or both) that are all capitalized. In various embodiments, the indicator module 206 and/or the text assessment module 204 calculates a count of words of letters that are capitalized. In one example, the indicator module 206 may count words after NLP processing occurs to identify words that are capitalized.

In another example, the text assessment module 204 utilizes NLP (e.g., NLKT) to calculate a count of words in capital letters in the text of the article. In some embodiments, the text assessment module 204 and/or the indicator module 206 may count words that are capitalized only if they are longer than a predetermined length (e.g., words that are longer than four letters and are in all capitals).

The indicator module 206 may increase the weight of the score (e.g., the count of capitalized words). In some embodiments, the indicator module 206 multiplies the word count or the frequency of all caps indicator by a value (e.g., 1.5) if there are a number of capital words in a row (e.g., four or more words in a row).

The indicator module 206 may normalize the measure such that the measure is converted to a frequency of all caps indicator to between a range (e.g., −1 to 1 or 0 to 1).

The title capitals indicator may indicate the number of words and/or phrases in the title that are all in capital letters. In various embodiments, the indicator module 206 and/or the text assessment module 204 calculates a count of words that have capital letters in the title of the article. In one example, the indicator module 206 may count words after NLP processing occurs to identify words that are capitalized.

In another example, the text assessment module 204 utilizes NLP (e.g., NLKT) to calculate a count of words in capital letters in the title of the article. In some embodiments, the text assessment module 204 and/or the indicator module 206 may count words that are capitalized only if they are longer than a predetermined length (e.g., words that are longer than three letters and are in all capitals). The predetermined length values may be different for determining which words to include in the title capitals indicator than for determining which words to include in the frequency of all caps indicator.

The indicator module 206 may weigh the score (e.g., the count of capitalized words). In some embodiments, the indicator module 206 multiplies the word count or the frequency of all caps indicator by a value (e.g., 1.5) if there are a number of capital words in a row (e.g., three or more words in a row).

The indicator module 206 may normalize the measure such that the measure is converted to a title capitals indicator to between a range (e.g., −1 to 1 or 0 to 1).

In some embodiments, the indicator module 206 may generate a binary score (e.g., 0 or 1) or a Boolean value for the title capitals indicator indicating if there is more than one capital word or phrase.

The adverb count indicator may indicate the number of adverbs and/or adverbial phrases in the text of the article (e.g., body, title, and/or both). In various embodiments, the indicator module 206 and/or the text assessment module 204 calculates a calculates a count of adverbs and/or adverbial phrases in the text of the article. In one example, the indicator module 206 may identify adverbs and/or adverbial phrases after NLP processing occurs to identify words that are capitalized. In another example, the text assessment module 204 utilizes NLP (e.g., NLKT) count of adverbs and/or adverbial phrases in the text of the article.

The indicator module 206 may calculate the adverb count indicator by calculating a ratio of adverbs and/or adverbial phrases relative to each sentence or text of the article (e.g., a ratio of adverbs in the article to all words in the article resulting in a percentage). In various embodiments, the indicator module 206 may filter (e.g., remove) conjunctions, articles, and the like before determining the total number of words in the article and then calculate the ratio of adverbs and/or adverbial phrases to filtered text.

The indicator module 206 may normalize the adverb count indicator to between a range (e.g., −1 to 1 or 0 to 1).

The hate speech indicator may indicate a number of words and/or phrases in the text of the article that are associated with hate speech. In various embodiments, the indicator module 206 may determine any number of words and/or phrases in the text of the article that are associated with hate speech. In one example, the text assessment module 204 may parse all or some of the text of the article into sentences. The indicator module 206 may determine a hate speech indicator or count for each sentence, portion of text of the article, and/or the article.

In various embodiments, the machine learning training module 208 may train a machine learning hate model to assist in determination of a hate speech indicator. For example, the machine learning training module 208 may utilize a database that associates words, phrases, syntax, grammar, sentences, paragraph, context, themes, subthemes, and/or the like with different indications of hate speech.

Such a database may include, for example, a hate speech database provided by KAGGLE.

The machine learning training module 208 may also train the machine learning hate model based on known articles that may or may not be associated with known hate speech indicators. In one example, an expert panel (e.g., of linguists, journalists, language professionals, editors, and the like), may assess a corpus of articles and grade an article (e.g., each sentence, unit, portion, paragraph, and/or the like). The corpus and/or the associated hate speech indicators may be used to train the machine learning hate model.

For example, the machine learning training module 208 may utilize a portion of the hate speech database (e.g., from KAGGLE) as well as corpus and indicators from the expert panel to train a machine learning model.

Many different machine learning models may be trained and utilized. In one example, neural network and/or a long short-term memory unit (LSTM) is trained and utilized. The LSTM may be a variation of a recurrent neural network. In some embodiments, the machine learning training module 208 utilizes all or some of a hate speech database (e.g., from KAGGLE) as well as corpus and indicators from the expert panel to train the LSTM (e.g., termed herein as the "hate speech LSTM"). In some embodiments, the machine learning training module 208 may utilize a first portion of the hate speech database, corpus, and indicators from the expert panel to train the hate speech LSTM and a second portion of the hate speech database, corpus, and indicators from the expert panel to test the hate speech LSTM.

It will be appreciated that the text assessment module 204 may parse some or all of the text of the article into limited units or portions (e.g., sentences, strings of characters, sets of words, phrases, numbers, and/or the like). The indicator module 206 may determine hate speech (e.g., number of words and phrases) for each unit or portion.

In some embodiments, the indicator module 206 may average the number of hate speech words and/or phrases for each sentence to calculate a hate speech sentence measure. The indicator module 206 may also average each hate speech sentence measure throughout the article (and/or scale the calculation if there is a greater number of hate speech words and/phrases (or the average across any number of sentences is high) relative to a hate speech threshold.

The indicator module 206 may normalize the hate speech calculations of the text of the article to between a range (e.g., −1 to 1 or 0 to 1).

The hyper-partisan content indicator may indicate a number of words and/or phrases in the text of the article that are associated with highly partisan speech. In various embodiments, the indicator module 206 may determine any number of words and/or phrases in the text of the article that are associated with highly partisan speech. In one example, the text assessment module 204 may parse all or some of the text of the article into sentences. The indicator module 206 may determine a highly partisan speech indicator or count for each sentence, portion of text of the article, and/or the article.

In various embodiments, the machine learning training module 208 may train a machine learning highly partisan speech model to assist in determination of a highly partisan speech indicator. For example, the machine learning training module 208 may utilize a database that associates words, phrases, syntax, grammar, sentences, paragraph, context, themes, subthemes, and/or the like with different indications of highly partisan speech. Such a database may include, for example, a highly partisan speech database provided by KAGGLE.

The machine learning training module 208 may also train the machine learning highly partisan speech model based on known articles that may or may not be associated with known highly partisan speech indicators. In one example, an expert panel (e.g., of linguists, journalists, language professionals, editors, and the like), may assess a corpus of articles and grade an article (e.g., each sentence, unit, portion, paragraph, and/or the like). The corpus and/or the associated highly partisan speech indicators may be used to train the machine learning highly partisan speech model.

For example, the machine learning training module 208 may utilize a portion of the highly partisan speech database (e.g., from KAGGLE) as well as corpus and indicators from the expert panel to train a machine learning model.

Many different machine learning models may be trained and utilized. In one example, neural network and/or a long short-term memory unit (LSTM) is trained and utilized. The LSTM may be a variation of a recurrent neural network. In some embodiments, the machine learning training module 208 utilizes all or some of a highly partisan speech database (e.g., from KAGGLE) as well as corpus and indicators from the expert panel to train the LSTM (e.g., termed herein as the "highly partisan speech LSTM"). In some embodiments, the machine learning training module 208 may utilize a first portion of the highly partisan speech database, corpus, and indicators from the expert panel to train the highly partisan speech LSTM and a second portion of the highly partisan speech database, corpus, and indicators from the expert panel to test the highly partisan speech LSTM.

It will be appreciated that the text assessment module 204 may parse some or all of the text of the article into limited units or portions (e.g., sentences, strings of characters, sets of words, phrases, numbers, and/or the like). The indicator module 206 may determine highly partisan speech (e.g., number of words and phrases) for each unit or portion.

In some embodiments, the indicator module 206 may average the number of highly partisan speech words and/or phrases for each sentence to calculate a highly partisan speech sentence measure. The indicator module 206 may also average each highly partisan speech sentence measure throughout the article (and/or scale the calculation if there is a greater number of highly partisan speech words and/phrases (or the average across any number of sentences is high) relative to a highly partisan speech threshold.

The indicator module 206 may normalize the highly partisan speech calculations of the text of the article to between a range (e.g., −1 to 1 or 0 to 1) to create the hyper-partisan content indicator.

In some embodiments, the indicator module 206 may determine an offensive speech indicator for the article. The offensive speech indicator may indicate a number of words and/or phrases in the text of the article that are associated with offensive speech. In various embodiments, the indicator module 206 may determine any number of words and/or phrases in the text of the article that are associated with offensive speech. In one example, the text assessment module 204 may parse all or some of the text of the article into sentences. The indicator module 206 may determine an offensive speech indicator or count for each sentence, portion of text of the article, and/or the article.

In various embodiments, the machine learning training module 208 may train a machine learning offensive speech model to assist in determination of an offensive speech indicator. For example, the machine learning training module 208 may utilize a database that associates words, phrases, syntax, grammar, sentences, paragraph, context, themes, subthemes, and/or the like with different indications of offensive speech. Such a database may include, for example, an offensive speech database provided by KAGGLE.

The machine learning training module 208 may also train the machine learning offensive speech model based on known articles that may or may not be associated with known offensive speech indicators. In one example, an expert panel (e.g., of linguists, journalists, language professionals, editors, and the like), may assess a corpus of articles and grade an article (e.g., each sentence, unit, portion, paragraph, and/or the like). The corpus and/or the associated offensive speech indicators may be used to train the machine learning offensive speech model.

For example, the machine learning training module 208 may utilize a portion of the offensive speech database (e.g., from KAGGLE) as well as corpus and indicators from the expert panel to train a machine learning model.

Many different machine learning models may be trained and utilized. In one example, neural network and/or a long short-term memory unit (LSTM) is trained and utilized. The LSTM may be a variation of a recurrent neural network. In some embodiments, the machine learning training module 208 utilizes all or some of an offensive speech database (e.g., from KAGGLE) as well as corpus and indicators from the expert panel to train the LSTM (e.g., termed herein as the "offensive speech LSTM"). In some embodiments, the machine learning training module 208 may utilize a first portion of the offensive speech database, corpus, and indicators from the expert panel to train the offensive speech LSTM and a second portion of the offensive speech database, corpus, and indicators from the expert panel to test the offensive speech LSTM.

It will be appreciated that the text assessment module 204 may parse some or all of the text of the article into limited units or portions (e.g., sentences, strings of characters, sets of words, phrases, numbers, and/or the like). The indicator module 206 may determine offensive speech (e.g., number of words and phrases) for each unit or portion.

In some embodiments, the indicator module 206 may average the number of offensive speech words and/or phrases for each sentence to calculate an offensive speech sentence measure. The indicator module 206 may also average each offensive speech sentence measure throughout the article (and/or scale the calculation if there is a greater number of offensive speech words and/phrases (or the average across any number of sentences is high) relative to an offensive speech threshold.

The indicator module 206 may normalize the offensive speech calculations of the text of the article to between a range (e.g., −1 to 1 or 0 to 1) to create the offensive speech indicator.

The calls to action indicator may indicate an author's or organization's desire for the reader to take action, such as send a link to social media, send a letter, forward content, click a link, email, download software or the like. In various embodiments, the indicator module 206 and/or the text assessment module 204 identifies calls to action in the text of the article (e.g., through scanning for certain words or phrases) to determine one or more calls to action. The indicator module 206 may then calculate the calls to action indicator based on one or more calls to action identified in the article.

The indicator module 206 may normalize the calls to action indicator to between a range (e.g., −1 to 1 or 0 to 1) to create the calls to action indicator.

The adjective polarity indicator may indicate a polarization of adjectives and/or adverbs (e.g., "terrible" or "very terrible"). Strongly opinionated words in the text of the article (e.g., body, title, and/or both) may give weight to the adjective polarity indicator. In various embodiments, the indicator module 206 and/or the text assessment module 204 calculates a count of strongly opinionated words and/or phrases in the text of the article. In one example, the indicator module 206 may count strongly opinionated words and/or phrases after NLP processing occurs. In another example, the text assessment module 204 utilizes NLP (e.g., NLKT) count of strongly opinionated words and/or phrases in the text of the article.

The indicator module 206 may calculate the adjective polarity indicator by calculating a ratio of strongly opinionated words and/or phrases relative to each sentence or text of the article (e.g., a ratio of adverbs in the article to all words in the article resulting in a percentage). In various embodiments, the indicator module 206 may filter (e.g., remove) conjunctions, articles, and the like before determining the total number of words in the article and then calculate the ratio of strongly opinionated words and/or phrases to filtered text.

The indicator module 206 may normalize the adjective polarity indicator to between a range (e.g., −1 to 1 or 0 to 1) top create the adjective polarity indicator.

In some embodiments, the indicator module 206 may determine a clickbait indicator for the article. The clickbait indicator may indicate a number of words and/or phrases in the text of the article that are associated with clickbait. In various embodiments, the indicator module 206 may determine any number of words and/or phrases in the text of the article that are associated with clickbait. In one example, the text assessment module 204 may parse all or some of the text of the article into sentences. The indicator module 206 may determine a clickbait indicator or count for each sentence, portion of text of the article, and/or the article.

In various embodiments, the machine learning training module 208 may train a machine learning clickbait model to assist in determination of a clickbait indicator. For example, the machine learning training module 208 may utilize a database that associates words, phrases, syntax, grammar, sentences, paragraph, context, themes, subthemes, and/or the like with different indications of clickbait. Such a database may include, for example, a clickbait database provided by KAGGLE.

The machine learning training module 208 may also train the machine learning clickbait model based on known articles that may or may not be associated with known clickbait indicators. In one example, an expert panel (e.g., of linguists, journalists, language professionals, editors, and the like), may assess a corpus of articles and grade an article (e.g., each sentence, unit, portion, paragraph, and/or the like). The corpus and/or the associated clickbait indicators may be used to train the machine learning clickbait model.

For example, the machine learning training module 208 may utilize a portion of the clickbait database (e.g., from KAGGLE) as well as corpus and indicators from the expert panel to train a machine learning clickbait model.

Many different machine learning models may be trained and utilized. In one example, a neural network and/or a long short-term memory unit (LSTM) is trained and utilized. The LSTM may be a variation of a recurrent neural network. In some embodiments, the machine learning training module 208 utilizes all or some of a clickbait database (e.g., from KAGGLE) as well as corpus and indicators from the expert panel to train the LSTM (e.g., termed herein as the "clickbait LSTM"). In some embodiments, the machine learning training module 208 may utilize a first portion of the clickbait database, corpus, and indicators from the expert panel to train the clickbait LSTM and a second portion of the clickbait database, corpus, and indicators from the expert panel to test the clickbait LSTM.

It will be appreciated that the text assessment module 204 may parse some or all of the text of the article into limited units or portions (e.g., sentences, strings of characters, sets of words, phrases, numbers, and/or the like). The indicator module 206 may determine clickbait (e.g., number of words and phrases) for each unit or portion.

In some embodiments, the indicator module 206 may average the number of clickbait words and/or phrases for each sentence to calculate a clickbait sentence measure. The indicator module 206 may also average each clickbait sentence measure throughout the article (and/or scale the calculation if there is a greater number of clickbait words and/phrases (or the average across any number of sentences is high) relative to a clickbait threshold.

The indicator module 206 may normalize the clickbait calculations of the text of the article to between a range (e.g., −1 to 1 or 0 to 1) to create the clickbait indicator.

In some embodiments, the indicator module 206 may generate lightweight scores. For example, the text assessment module 204 and/or the indicator module 206 may generate word count vectors of text in the article using TF-IDF. In various embodiments, the indicator module 206 applies dimensionality reduction to reduce the number of data features (e.g., the number of dimensions) in the data set calculated using TF-IDF to identify principal components. LSA attempts to find similarities in the domains of words. In the representation used by LSA, a document is seen as an unordered collection of words, and the matrix of words versus documents may be analyzed with SVD, so that information may be sorted into implicit categories. SVD allows an exact representation of any matrix, and also may eliminate the less important parts of that representation to produce an approximate representation with any desired number of dimensions.

The lightweight scores may then be applied to a lightweight neural network to generate an credibility indication and an opinion indication. In various embodiments, the credibility system 110 and/or an application on the user system 104 may display the credibility indication and an opinion indication (e.g., as dials) without further processing.

The lightweight neural network may be trained using a variety of methods. For example, the lightweight neural network may be trained using an output from the indicator machine learning model described herein.

In various embodiments, the lightweight scores are provided to the credibility system 110 for further processing with the other indicators to generate credibility scores.

In various embodiments, the ML training module 208 receives a training set of data from the expert panel. For example, the expert panel may receive a set of articles and provide a consensus regarding a credibility score and/or bias score for each article. The expert panel may provide a consensus regarding one or more of the credibility indicators discussed herein.

The ML training module 208 may train a credibility machine learning model (e.g., neural network or other machine learning model such as a random forest or the like) based on or using all or some of the set of articles as well as the credibility scores, bias scores, and all or some of the indicators discussed herein associated with that set of articles.

The ML training module 208 may test and/or validate the credibility machine learning model using a subset of the articles as well as the credibility scores, bias scores, and all or some of the credibility indicators associated with that set of articles.

The ML model module 201 may then apply any number of indicators (based on the number of credibility indicators used to create the machine learning model) to the credibility machine learning model created and/or tested by the ML training module 208 to generate a credibility score and a bias score.

In some embodiments, the text assessment module 204 may generate the sentiment score using all or some of the sentiment indicators for a particular article. In one example, the sentiment score is not determined using the credibility machine learning model (although the credibility score and the bias score may be generated by applying the sentiment with other indicators to the machine learning model). In this example, the sentiment score is created based on NLP and/or utilization of a sentiment machine learning dataset to create the sentiment LSTM which may provide a sentiment score based on text of an article.

The categorization module 212 may predetermine a range of possible credibility scores, bias scores, and sentiment scores. The categorization module 212 may categorize portions of each range to assist with communicating the credibility scores, bias scores, and sentiment scores. For example, the categorization module 212 may categorize the credibility score as follows: the categorization module 212 may label the bottom 20% as "probably questionable," the range from 21%-40% as "likely questionable," the range from 41%-60% as "uncertain," the range from 61%-80% as "likely credible," and the range from 81%-100% as "probably credible." It will be appreciated that the categorization module 212 may provide any number of categories with any number of labels over the range of possible scores.

In another example, the categorization module 212 may categorize the bias score as follows: the categorization module 212 may label the bottom 20% as "probably biased," the range from 21%-40% as "likely biased," the range from 41%-60% as "uncertain," the range from 61%-80% as "likely impartial," and the range from 81%-100% as "probably impartial."

In a further example, the categorization module 212 may categorize the sentiment score as follows: the categorization module 212 may label the bottom 20% as "probably emotional," the range from 21%-40% as "likely emotional," the range from 41%-60% as "uncertain," the range from 61%-80% as "likely unemotional," and the range from 81%-100% as "probably unemotional."

The graphical user interface (GUI) module 214 may be configured to provide display information to present a graph or icons indicating the credibility score, the bias score, and/or the sentiment score. For example, if a user navigates to a web page containing an article using the user's browser, the credibility system 110 may utilize the credibility machine learning module to generate a credibility score and a bias score. Similarly. the credibility system 110 may generate a sentiment score (discussed herein). The GUI module 214 may display the scores using dials, icons, graphs, video, animations, audio, and/or the like to indicate the relative strength of each of the scores.

The feedback module 220 may be configured to receive feedback from users regarding a credibility score, the bias score, and/or the sentiment score of an article. For example, if a user navigates to a web page containing an article using the user's browser, the credibility system 110 may utilize the credibility machine learning module to generate a credibility score and a bias score. Similarly. the credibility system 110 may generate a sentiment score (discussed herein). The GUI module 214 may display the scores using dials, icons, graphs, video, animations, audio, and/or the like to indicate the relative strength of each of the scores. The GUI module 214 may present the user with an opportunity to indicate whether they agree or disagree with one or more of the scores.

The feedback module 220 may receive the feedback. In various embodiments, if a number of users that provide feedback related to an article which disagrees with one or more of the scores is greater than a feedback threshold or if the degree of negative feedback is sufficiently strong from a smaller number of users that is lower than a severity threshold, then the credibility system 110 may reassess the article in question.

In various embodiments, the credibility system 110 may periodically regenerate (e.g., retrain and/or test) the credibility machine learning model using information from the expert panel and/or feedback from users regarding known articles.

The credibility system 110 may store the credibility score, the bias score, and/or the sentiment score for any number of articles. For example, the credibility system 110 may store identification an article (e.g., based on URL or other information) as well as the credibility score, the bias score, and/or the sentiment score for that article. If the user navigates to a previously assessed article that is contained within the storage, the credibility system 110 may determine if the article has already been assessed and, if so, provide the user with a previously determined credibility score, the bias score, and/or the sentiment score, for that article. If the user navigates to an article that was not previously assessed then the credibility system 110 may determine that the article has not been previously assessed and subsequently assess the article to generate the credibility score, the bias score, and/or the sentiment score for that particular article, provide the scores to the user, and store the information in storage.

The storage module 218 may be any storage medium and/or data structure configured to store identifiers of articles (e.g., URL or other information associated with the article) as well as the credibility score, the bias score, and/or the sentiment score for that article.

The API module 216 may provide an API to users and/or other systems to enable those users and/or other systems to provide article identifiers and retrieve the credibility score, the bias score, and/or the sentiment score for that article if available. In one example, a user system 104 may navigate to a particular webpage that includes an article. Software on the user system 104 may provide an identifier of the webpage and/or the article to the credibility system 110 using the API module 216. The credibility system 110 may utilize the identifier of the webpage or other related information to identify the article and then determine if the credibility score, the bias score, and/or the sentiment score for that article has been previously stored in the storage module 218. If the credibility score, the bias score, and/or the sentiment score for that article was previously stored in the storage module 218, the API module 216 may retrieve the scores and provide them back to the user. If the scores were not previously stored by the credibility system 110, then the credibility system 110 may generate credibility indicators and/or generate new scores to provide back to the user.

In another example, the ad server 112 may utilize the API module 216 to identify credibility of an article or webpage prior to providing a particular advertisement. In one example, certain brands and luxury goods may not be willing to place their advertisements within or alongside questionable articles or content of a webpage. Some brands may require only the highest credibility scores of webpages and/or articles before allowing their advertisements to be displayed. Each brand may have its own criteria. It will be appreciated that the quality or goodwill of the brand may increase or decrease based on the articles or webpages that are adjacent to their advertisements.

For example, the user system 104 may use a browser to navigate to a particular webpage that includes a link or a call for an advertisement from the ad server 112. The ad server 112 may provide identification information regarding the webpage and/or article on the webpage (e.g., URL or any identifier) to the credibility system 110 using the API module 216. The credibility system 110 may determine if the credibility score, the bias score, and/or the sentiment score for that article has been previously computed and stored in the storage module 218. If the scores have been previously stored, the API module 216 may provide one or more of the scores back to the ad server 112. The ad server 112 may then select one or more advertisements based on criteria of different brands. This enables the brands to better control where they are being displayed. Further, it will be appreciated, that the ad server 112 may be able to charge more for placing advertisements next to highly credible and desirable content. The brands may be willing to pay more for that assurance as well as increasing the likelihood that users viewing such content may be more apt to interact or click on an advertisement next to desirable and credible content.

A module may be hardware (e.g., an integrated chip, ASIC, or the like), software, or a combination of both.

Figure 3:
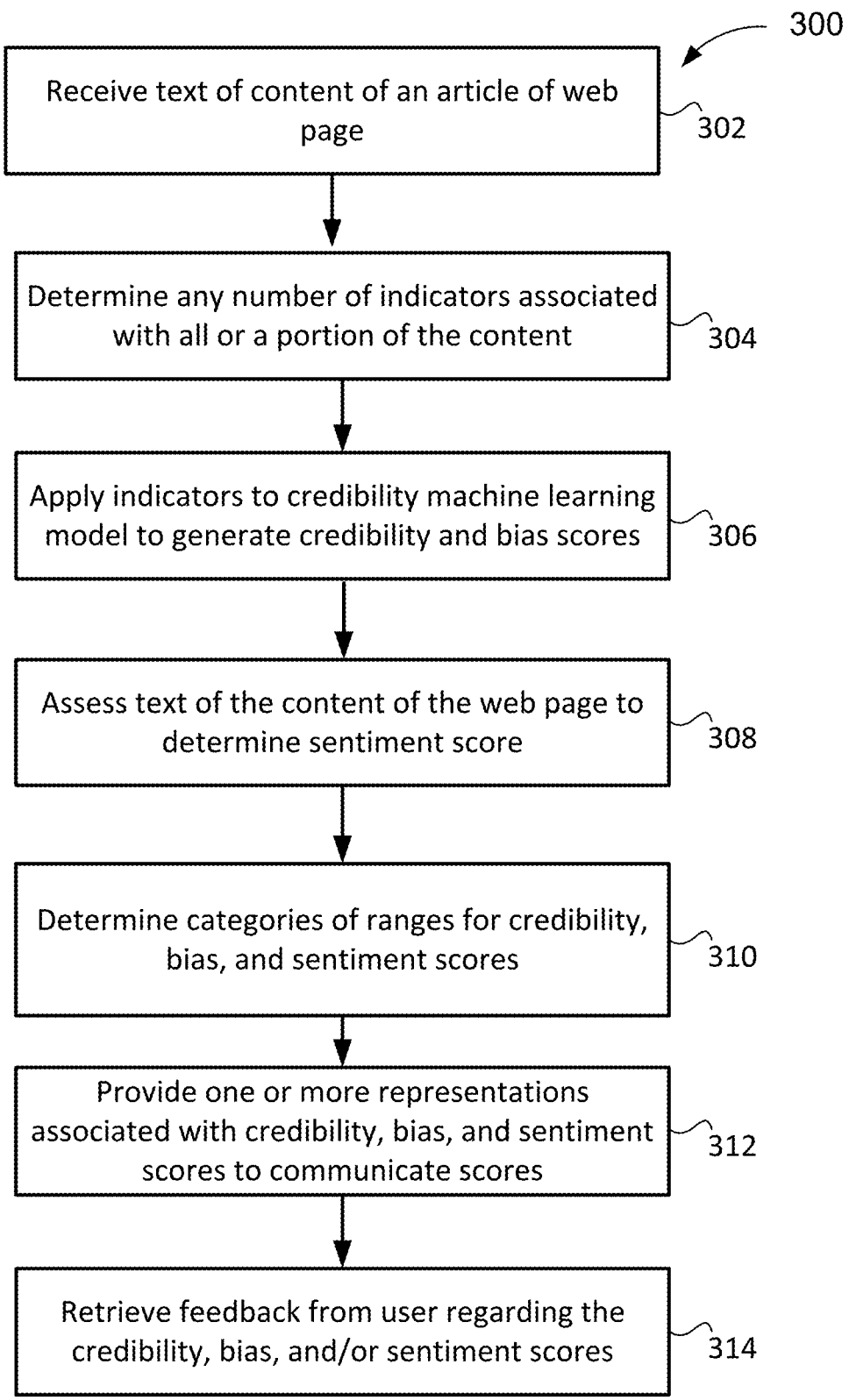
FIG. 3 is an example flowchart of a method for determining credibility scores of text of content of an article.

FIG. 3 is an example flowchart of a method for determining credibility scores of text of content of an article. In step 302, the content module 202 receives text of content an article of a webpage. In one example, a user system 104 requests credibility scores associated with text in a particular webpage. The user system 104 may provide the text of the webpage and/or a webpage or article identifier. The webpage or article identifier may identify a webpage or article that contains the content. One example the webpage or article identifier is a URL or location. In some embodiments the content module 202 may retrieve text of content from the article based on the webpage or article identifier.

In some embodiments, the content module 202 may retrieve or receive text associated with content of the webpage. In order to analyze the most relevant content of the webpage, the content module 202 may filter out irrelevant content or retrieve only useful contact. The content module 202 may identify useful and/or unuseful content in any number of ways. In some embodiments, the content module 202 may filter or ignore banners, hatters, links, unrelated media, and/or the like such that the credibility scores are associated with an article such as the theme of the content of the webpage.

In some embodiments, the text assessment module 204 may perform natural language processing on the text of the content from the webpage in order to parse words, phrases, sentence structure, sentiment, and/or the like.

In step 304, the indicator module 206 may determine any number of indicators associated with all or a portion of the content. The indicator module 206 may calculate any number of indicators using the processed language from the text assessment module 204.

The indicator module 206 may determine any number of indicators including all or some of the following:
1. Number of quotes indicator
2. Sentiment indicator 3. Title subjectivity indicator
4. Text subjectivity indicator
5. Title topic indicator
6. Frequency of all caps indicator
7. Title caps indicator
8. Adverb count indicator
9. Hate speech indicator
10. Hyper-partisan content indicator
11. Calls to action indicator
12. Adjective polarity indicator
13. Clickbait indicator For example, the indicator module 206 may determine a number of pairs of quotes of the text of the content of the webpage to create the number of quotes indicator. Indicator module 206 may calculate the number of pairs of quotes of the text using the process language from the text assessment module 204. In some embodiments, the text assessment module 204 may calculate the number of pairs of quotes and create the number of quotes indicator.

The indicator module 206 may determine a title subjectivity indicator to represent subjectivity in the title of the content of the webpage. The text assessment module 204 may utilize NLP to identify subjectivity of words, phrases, or the like in the title of the webpage or content of the webpage. In one example, the indicator module 206 may determine a subjectivity score utilizing NLP for words and phrases in the title.

Similarly, the indicator module 206 may determine a text subjectivity indicator to represent subjectivity in the text of the content of the webpage. The text assessment module 204 may utilize NLP to identify subjectivity of words, phrases, or the like in the text of the webpage or content of the webpage. In one example, the indicator module 206 may determine the subjectivity score utilizing NLP for words and phrases in each sentence of the text and indicator module 206 may determine a text subjectivity indicator for the content of the webpage based on the text subjectivity indicators of one or more the sentences.

Indicator module 206 may determine a title topic indicator to indicate a relationship between key words and/or phrases in the title and keywords and/or phrases in the body of the content of the webpage. In one example, the text assessment module 204 utilizes NLP to identify keywords and phrases in the title of the content of the webpage as well as the body of the content of the webpage. As discussed herein, the indicator module 206 may utilize TF-IDF to determine important words and/or phrases in the body and the title. Indicator module 206 may also apply dimensionality reduction and identify similarities to compute to the title topic indicator.

Indicator module 206 may determine a frequency of all capitalization indicator based on a frequency of words, phrases, or the like in the content of the webpage that are all capitalized. In some embodiments, the indicator module 206 may only count words that are both all capitalized and equal to or greater than a predetermined threshold of a number of characters.

Similarly, the indicator module 206 may determine a title capitalization indicator based on a frequency of words, phrases, or the like in the content of the title of the webpage that are all capitalized. In some embodiments, the indicator module 206 may only count words that are both all capitalized in the title and equal to or greater than a predetermined threshold of a number of characters.

The indicator module 206 may determine an adverb count indicator to indicate a number of adverbs and/or adverbial phrases in the text of the content of the webpage relative to a number of words and/or phrases in the overall text of the content of the webpage. In some embodiments, the indicator module 206 and/or the text assessment module 204 may identify adverbs and/or adverbial phrases based on the language from the NLP process. In some embodiments, the indicator module 206 may filter or remove conjunctions, articles, and/or the like to reduce the computational burden of identifying adverbs and/or adverbial phrases. The adverb count indicator may be a ratio or percentage indicating a ratio of adverbs and/or adverbial phrases relative to words and phrases in the content of the webpage.

Indicator module 206 may determine hate speech, offensive speech, and/or hyper-partisan content indicators. For example, after the text assessment module 204 applies NLP to the content of the webpage, the indicator module 206 may identify words associated with hate speech, offensive speech, and/or hyper-partisan speech based on any number of databases of such languages to identify words and phrases associated with these linguistic components. Indicator module 206 may identify a hate speech indicator, and offensive speech indicator, and/or a hyper-partisan content indicator for the content of the webpage based on measures of hate speech, offensive speech, and/or hyper-partisan speech of each sentence or portion of the content, respectively.

Indicator module 206 may determine a call to action indicator based on a number of calls to action found in the content of the webpage or any other place on the webpage. Calls to action may include a request to share content on social media, request to interact with the interactive elements of the webpage, request to email, request to call, request to download executable code and/or the like.

Indicator module 206 may determine an adjective polarity indicator of the content of the webpage. For example, as discussed herein, the text assessment module 204 may utilize NLP to identify adjectives and one or more sentences of the content of the webpage. The indicator module 206 may apply those identifications to a machine learning model to identify a polarity of adjectives to calculate the adjective polarity indicator.

The indicator module 206 may determine a click paid indicator by applying language from the content of the webpage after NLP processing to a click may data set and/or machine learning model to create a click paid indicator for the content of the article.

In step 306, the indicator module 206 and/or the machine learning model module 210 may apply all or some of these indicators to a machine learning model to generate a credibility score and a bias score for the content of the webpage. As discussed herein, the machine learning model may have been created based on content of web pages and based on an expert panel's review of those same webpages including the expert panel's evaluation of each of the indicators as well as credibility scores and buys scores for the content of those webpages. The machine learning model may be any model which may include a neural network, random forest, statistical approximation, and/or the like.

In step 308, the indicator module 206 may assess the text of the content of the webpage to determine a sentiment score. In one example, the indicator module 206 may calculate a sentiment indicator for text of the content of the webpage. The sentiment indicator may, in some embodiments, be also based on a sentiment indication of language within quotes of the content of the webpage. The indicator module 206 may calculate the sentiment indicator based on any number of text sentiment indicators of each sentence of the webpage. In some embodiments, the text assessment module 204 may parse all or some of the text of the webpage into sentences. The text assessment module 204 may utilize NLP to identify sentiment of each sentence. The indicator module 206 may utilize a sentiment machine learning model (e.g., a sentiment LSTM) as discussed herein with the identified sentiment to determine a sentiment score for the content of the webpage.

The indicator module 206 may, in some embodiments, calculate a quote sentiment indicator which may represent sentiment associated with the content of any number of quotes of the content of the webpage. Similar to the sentiment indicator above, the indicator module 206 or the text assessment module 204 may identify content of one or more quotes and may assess the language in the quotes for sentiment. Indicator module 206 may apply the quote sentiment measures to a machine learning model to determine one or more quote sentiment indicators for the content of the webpage.

In step 310, the categorization module 212 may determine categories associated with each credibility score, bias score, and sentiment score, relative to a set of predetermined ranges.

In step 312, the GUI module 214 may provide one or more representations associated with the credibility, bias, and sentiment scores to communicate those scores. In some embodiments, the GUI module 214 may utilize the categories to provide graphics and/or icons to communicate relative credibility, bias, and sentiment of the content of the webpage.

An optional step 314, the feedback module 220 may receive feedback from a user or user device 104 regarding the credibility, bias, and/or sentiment scores of the content of the webpage. In one example, a user of the user device 104 may receive a graphical representation of the credibility, bias, and sentiment scores of the content of the webpage. The user may be encouraged to provide feedback to indicate the agreement or disagreement with the credibility, bias, and/or sentiment scores of the content. Based on the number of negative feedback responses of content of a particular webpage and/or the strength of the negative feedback, the content of the webpage may be reassessed and/or machine learning model used to create the credibility score in the bias score may be retrained and retested utilizing the user feedback.

Figure 4:
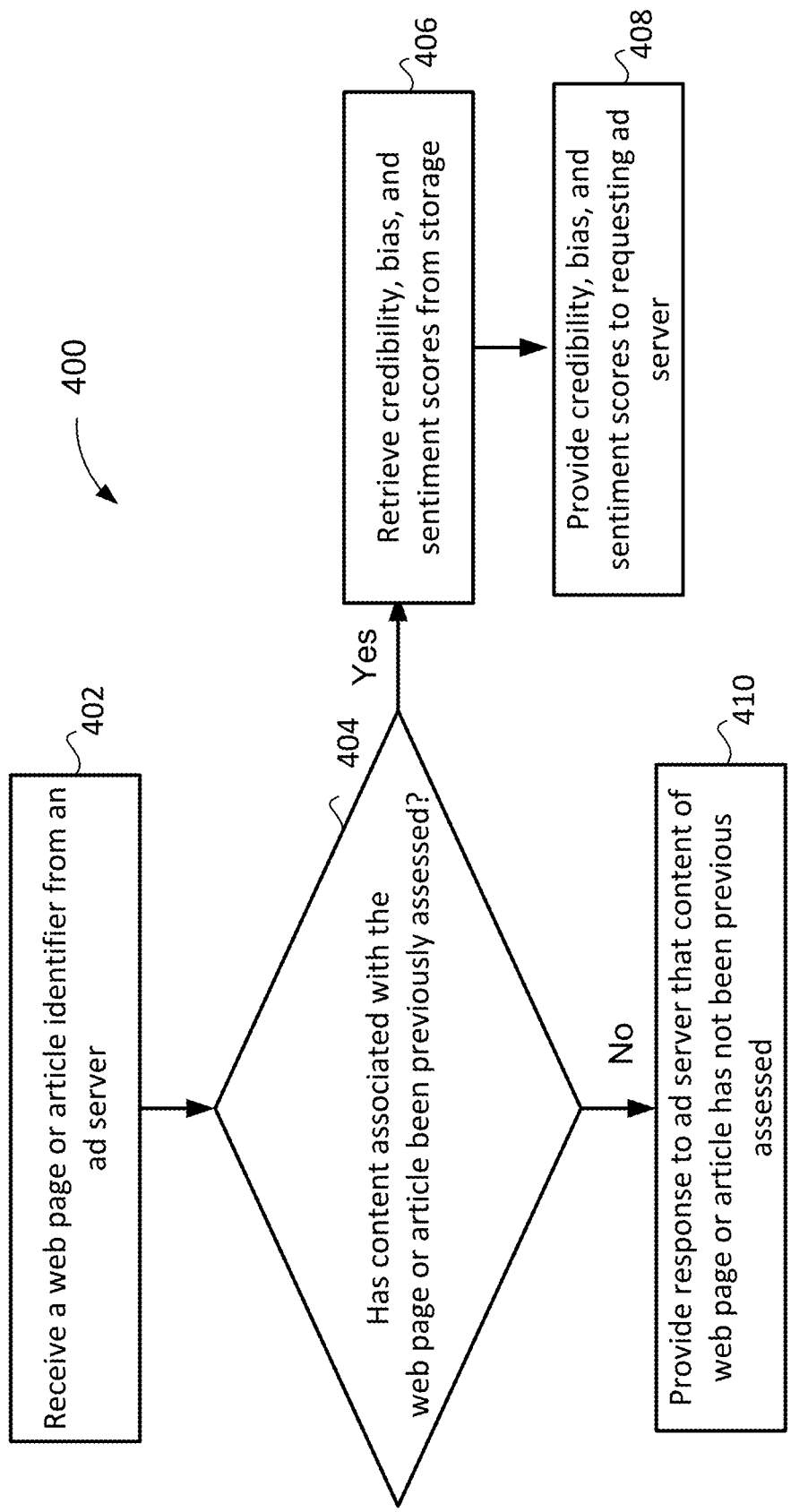
FIG. 4 is a method for providing credibility scores to an ad server.

FIG. 4 is a method for providing credibility scores to an ad server 112. In step 402, the content module 202 receives a webpage or article identifier from an ad server 112. For example, an ad server 112 may receive a request to serve an advertisement to a particular webpage. The ad server 112 may utilize the request to identify the webpage or content within the webpage and provide that identification to the content module 202.

In step 404, the storage module 218 may determine if content associated with the webpage or article has been previously assessed. The storage module 218 may determine if content associated with the webpage or article has been previously assessed in any number of ways. For example, previously assessed webpages or articles may be stored in the storage module 218 utilizing webpage and/or article identifiers or any other means. The storage module 218 may utilize the webpage article identifier received from the ad server 112 to identify previously stored webpages and articles.

It will be appreciated that, in some embodiments, there may not be enough time to create new credibility, bias, and/or sentiment scores for a webpage within the time needed for the ad server 112 to provide an advertisement in response to request. As such, the credibility system 110 may check to see if the identified webpage has been previously assessed and, if so, then provide previously stored credibility scores to the ad server 112. If the credibility system 110 did not previously assess the webpage, the credibility system 110 may provide a response back to the requesting ad server 112 indicating that the requested information is not available.

If the content associated with the webpage article has been previously assessed, then in step 406 the storage module 218 may retrieve the credibility, bias, and/or sentiment scores from storage and in step 408 provide the credibility, bias, and/or sentiment scores to the requesting ad server 112. Subsequently, the ad server 112 may identify one or more advertisements to provide to the requesting webpage based in part on the credibility, bias, and/or sentiment scores from the credibility server 110 as well as any criteria associated with any advertisements.

In step 410, if the storage module 218 determines that content associated with the webpage or article has not been previously assessed, the credibility system 110 may respond to the ad server 112 that no information is available. In some embodiments, if there has been a request from an ad server 112 for identified webpage or article in which no previous assessment has been made, that the credibility system 110 may subsequently assess that webpage article in the future and store credibility, bias, and/or sentiment scores to provide in the future.

Figure 5:
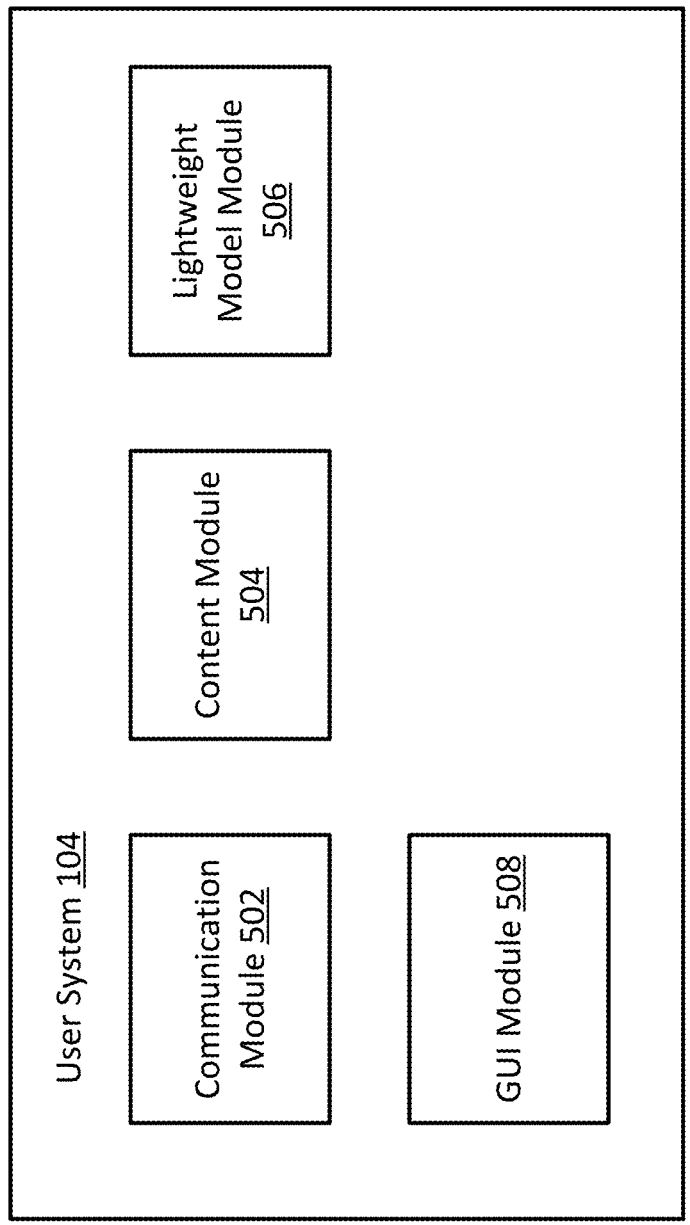
FIG. 5 depicts an example user system in some embodiments.

FIG. 5 depicts an example user system 104 in some embodiments. The user system 104 may include a communication module 502, a content module 504, a lightweight model module 506, and a GUI module 508. In some embodiments, the user of the user system 104 may utilize a browser on the user system 104 to navigate to a webpage. The user system 104 may include software such as a browser extension or the like that enables content of webpages to be assessed for credibility scores, bias scores, and/or sentiment scores.

In some embodiments, the user system 104 provides the credibility system 110 with a webpage identifier or content identifier so that the credibility system 110 may provide previously stored scores back to the user system 104 or calculate indicators as discussed herein and calculate new credibility scores, bias scores, and/or sentiment scores to provide back to the user system 104. In some embodiments, the user system 104 may provide all or part of the content of the webpage to the credibility system to determine if the credibility system 110 has previously assessed the content and/or enable the credibility system 110 to generate new credibility scores, bias scores, and/or sentiment scores to provide back to the user system 104.

In various embodiments, the user system 104 may utilize a previously stored lightweight machine learning model with all or part of the content of the webpage in order to generate credibility scores, bias scores, and/or sentiment scores without relying on the credibility system 110.

The content module 504 may retrieve text and/or filter out irrelevant content from a webpage. In some embodiments, the content module 504 may apply natural language processing or a lightweight version of natural language processing to contents of the webpage.

The lightweight model module 506 may apply all or some of the content from the webpage (e.g., the previously processed content from the content module 504) to the lightweight model to generate a credibility score, bias score, and/or sentiment score. In some embodiments, the credibility system 110 may provide the user system 104 with the content module 504 and/or the lightweight model module 506 (e.g., the lightweight machine learning module).

Lightweight model module 506 may provide the credibility score, bias score, and/or sentiment score to the GUI module 508 and/or the credibility system 110. The credibility system 110 may, in some embodiments, utilize the credibility score, bias score, sentiment score, edit the other results from the lightweight model module 506 to assist in assessing the credibility score, bias score and/or sentiment score utilizing the processes discussed herein. It will be appreciated that in some embodiments, the lightweight model module 506 may provide general scores for credibility, bias, and sentiment but that the credibility system 110 utilizing any number of the indicators as discussed herein may provide a more accurate and/or robust scoring system.

The GUI module 508 may generate one or more graphics and/or icons based on the credibility, bias, and sentiment scores as well as predetermined categories for ranges associated with each score. The GUI module 508 may present the graphics and/or icons to the user to assist with their understanding of the scores for the webpage.

Figure 6:
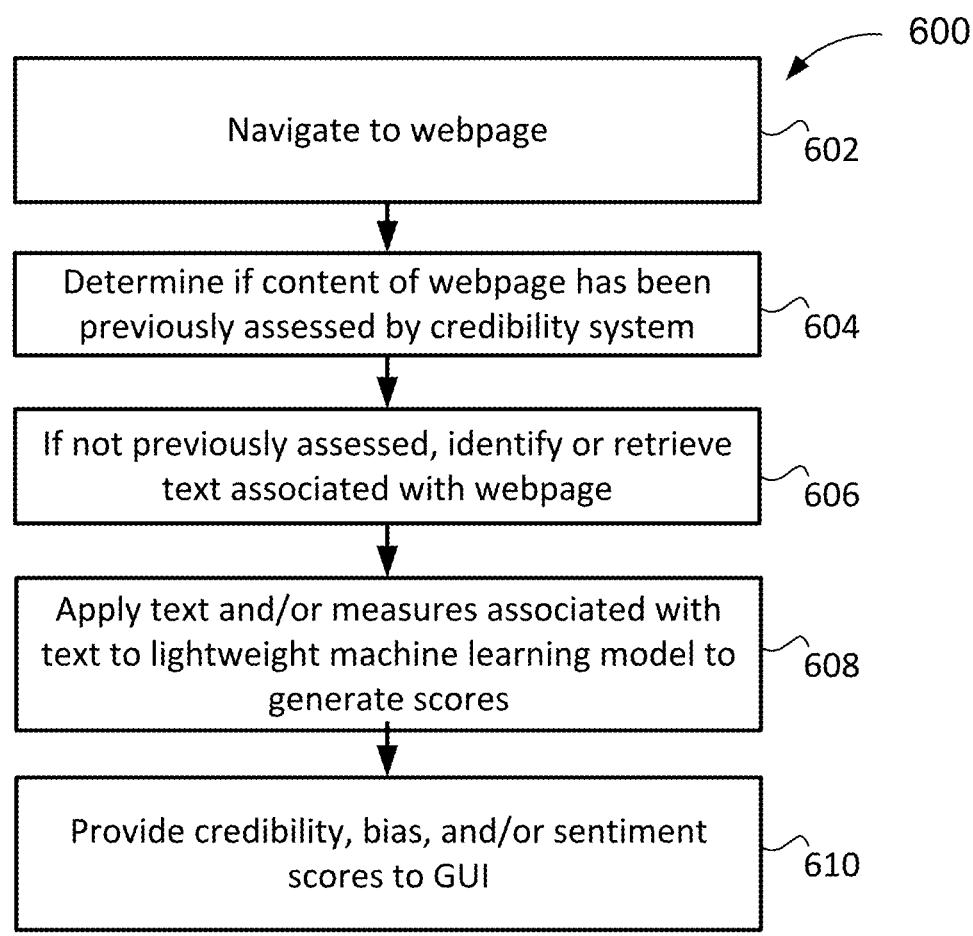
FIG. 6 is a flowchart of a method for generating credibility scores using a user system 104 in some embodiments.

FIG. 6 is a flowchart of a method for generating credibility scores using a user system 104 in some embodiments. In step 602, the user system 104 browses to a webpage. In step 604, the communication module 502 provides a webpage indicated to credibility system 110 to determine if the credibility system 110 has already assessed content in the webpage. If the credibility system 110 is already assessed content in the webpage, the credibility system 110 may determine if the date of the assessment of the content in the webpage predates a particular duration threshold. If the date of the assessment of the content in the webpage does not predate a particular duration threshold, then the credibility system 110 may retrieve the credibility, bias, and/or sentiment scores from storage and provide the scores to the user system 104 to be displayed by the GUI module 508. If the date of the assessment of the content in the webpage predates a particular duration threshold or if there's not been a previous assessment of content of that webpage than the method may continue to step 606.

In step 606, if the credibility system 110 did not assess content in the webpage, the content module 504 identifies text in all or some of the webpage. In some embodiments, the content module 504 may apply all or some natural language processing to the content of the webpage.

In step 608, lightweight model module 506 applies all or some of the text from the content module 502 a lightweight machine learning model to generate credibility, bias, and/or sentiment scores associated with content of the webpage. The communication module 502 may provide the credibility, bias, and/or sentiment scores to the credibility system 110 for further processing.

In step 610, the GUI module 508 may provide the credibility, bias, and/or sentiment scores and/or graphical representations of the credibility bias and/or sentiment scores to the user of the user system 104.

Figure 7:
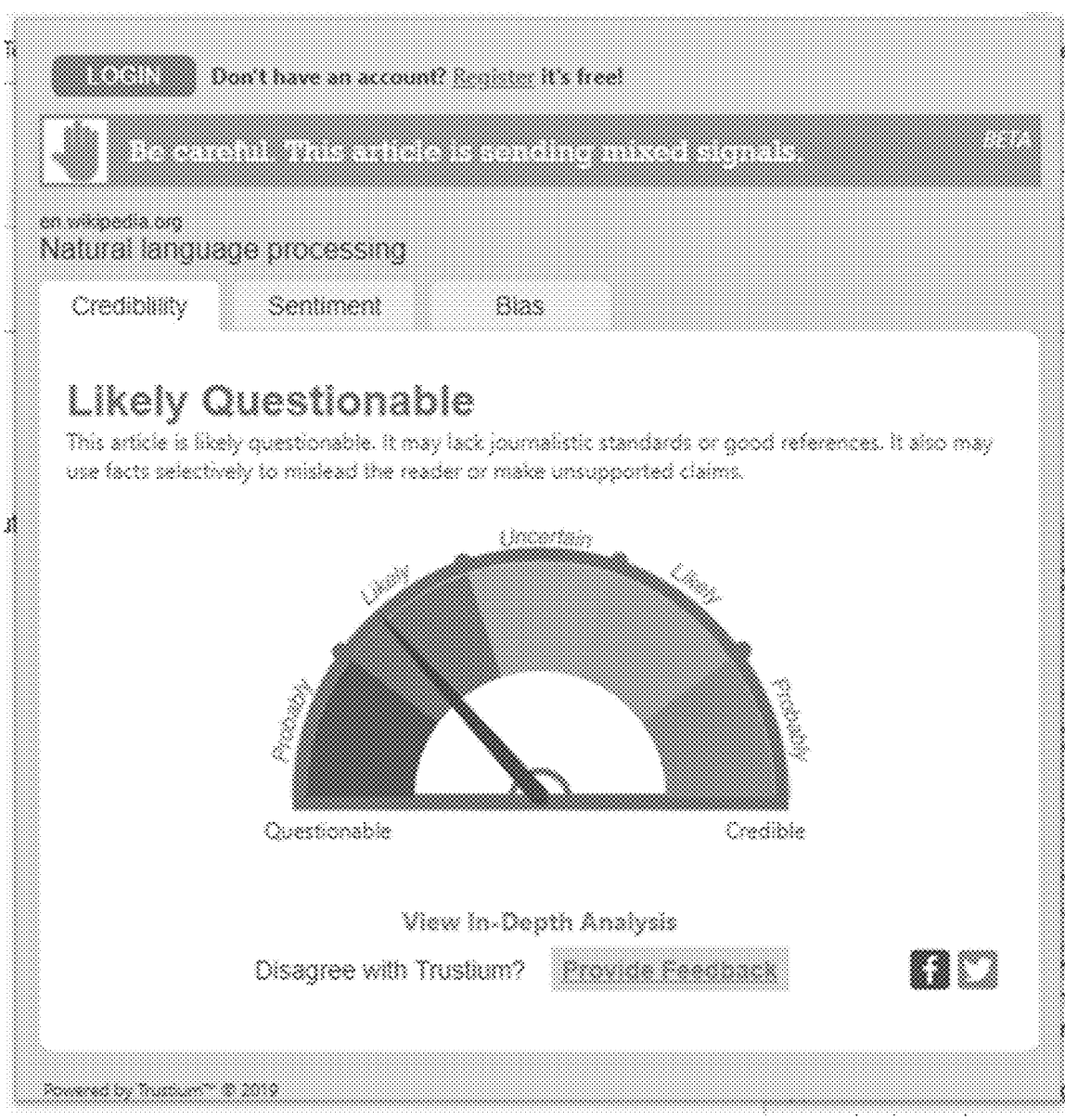
FIG. 7 depicts a graphic representing a degree of credibility of a particular web page in some embodiments.

FIG. 7 depicts a graphic 700 representing a degree of credibility of a particular web page in some embodiments. The graphic 700 of FIG. 7 depicts a series of ranges and the significance of those ranges related to a credibility score of content of a webpage. In this example, the credibility score of the content of the webpage in question falls within the lower 20 to 40% of possible credibility scores. As such, the GUI indicates an arrow in a dial graphic showing that the content of the webpage is likely questionable. In this example, the dial may have multiple colors wherein each category may be depicted with a different color. For example, the probably questionable range may be red, the likely questionable range may be orange, the uncertain range may be yellow, the likely credible range may be light green, and the probably credible range may be dark green.

Figure 8:
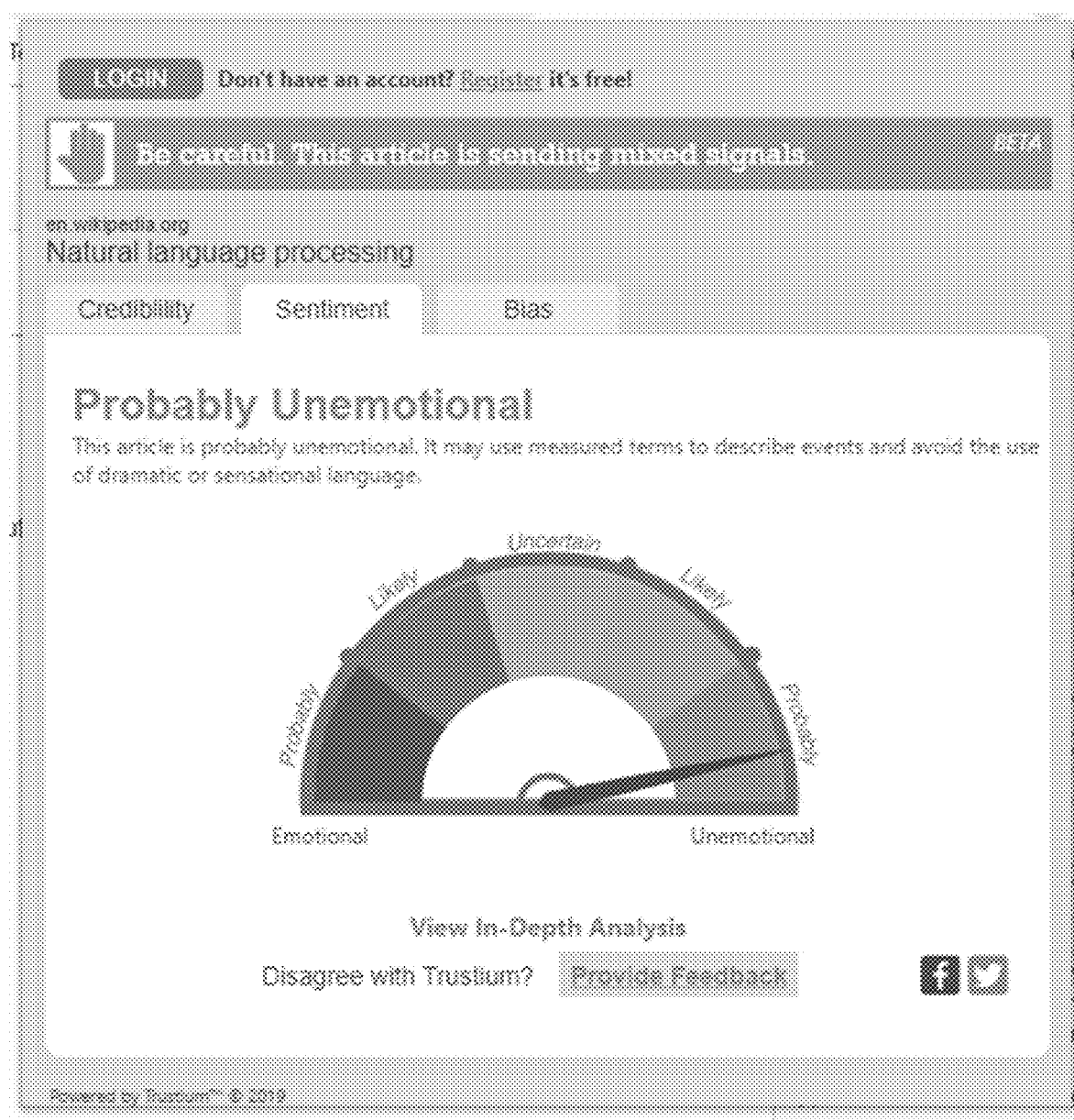
FIG. 8 depicts a graphic representing a degree of sentiment of a particular web page in some embodiments.

FIG. 8 depicts a graphic 800 representing a degree of sentiment of a particular web page in some embodiments. Similar to the graphic 700 of FIG. 7, the graphic 800 of FIG. 8 depicts a series of ranges and the significance of those ranges related to a sentiment score of content of a webpage. In this example, the sentiment score of the content of the webpage in question falls within the upper 90 to 100% of possible bias scores. As such, the GUI indicates an arrow in a dial graphic showing that the content of the webpage is likely unemotional. In this example, the dial may have multiple colors wherein each category may be depicted with a different color. For example, the probably emotional range may be red, the likely emotional range may be orange, the uncertain range may be yellow, the likely unemotional range may be light green, and the probably unemotional range may be dark green.

Figure 9:
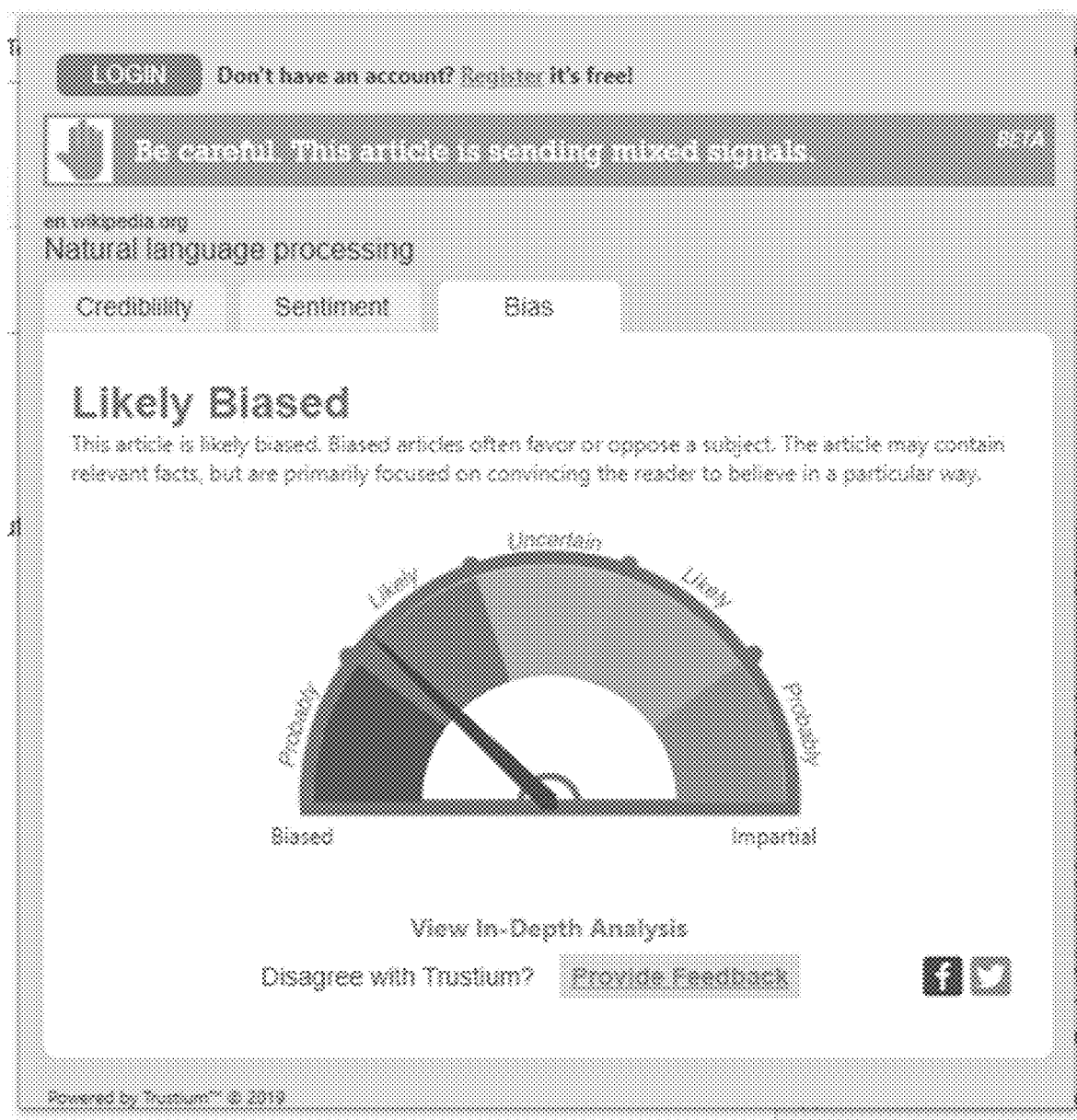
FIG. 9 depicts a graphic representing a degree of bias of a particular web page in some embodiments.

FIG. 9 depicts a graphic 900 representing a degree of bias of a particular web page in some embodiments. Similar to the graphics 700 and 800 of FIG. 7 and FIG. 8, the graphic 900 of FIG. 9 depicts a series of ranges and the significance of those ranges related to a bias score of content of a webpage. In this example, the bias score of the content of the webpage in question falls within the upper 20 to 40% of possible bias scores. As such, the GUI indicates an arrow in a dial graphic showing that the content of the webpage is likely biased. In this example, the dial may have multiple colors wherein each category may be depicted with a different color. For example, the probably biased range may be red, the likely biased range may be orange, the uncertain range may be yellow, the likely unbiased range may be light green, and the probably unbiased range may be dark green.

Figure 10:
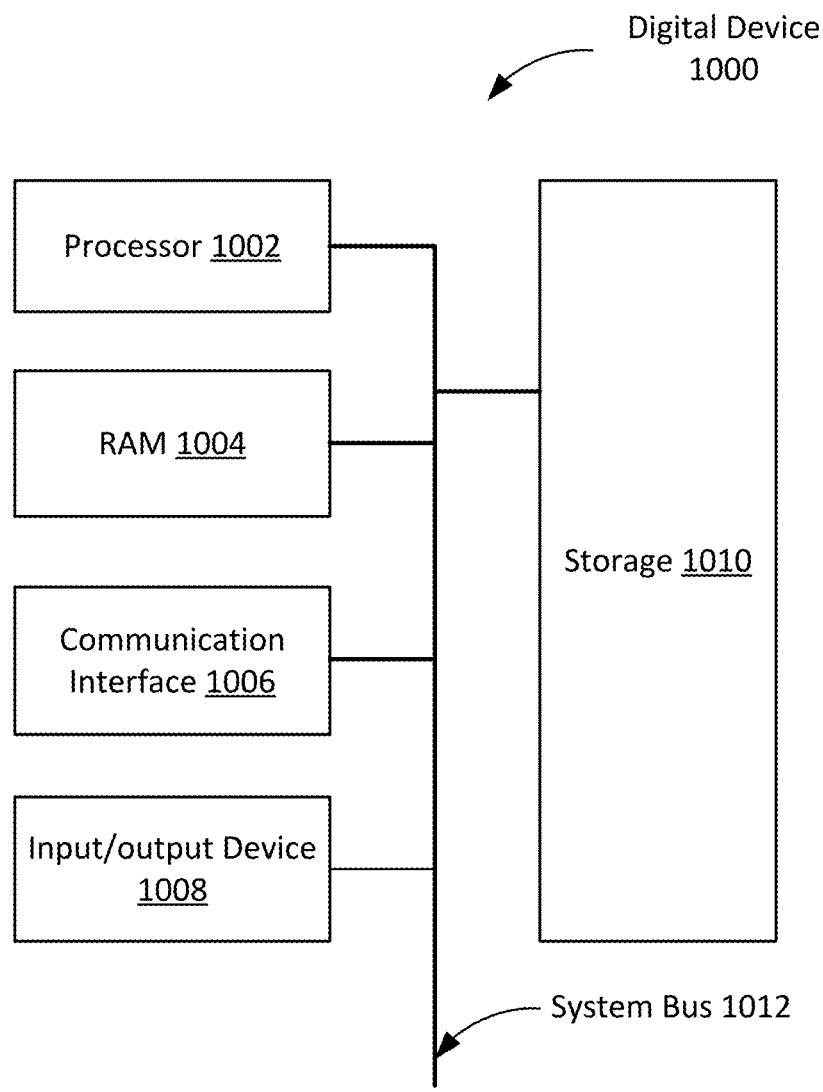
FIG. 10 depicts a block diagram of an example digital device according to some embodiments.

FIG. 10 depicts a block diagram of an example digital device 1000 according to some embodiments. Digital device 1000 is shown in the form of a general-purpose computing device. Digital device 1000 includes processor 1002, RAM 1004, communication interface 1006, input/output device 1008, storage 1010, and a system bus 1012 that couples various system components including storage 1010 to processor 1002.

System bus 1012 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Digital device 1000 typically includes a variety of computer system readable media. Such media may be any available media that is accessible by the digital device 1000 and it includes both volatile and nonvolatile media, removable and non-removable media.

In some embodiments, processor 1002 is configured to execute executable instructions (e.g., programs). In some embodiments, the processor 1004 comprises circuitry or any processor capable of processing the executable instructions.

In some embodiments, RAM 1004 stores data. In various embodiments, working data is stored within RAM 1004. The data within RAM 1004 may be cleared or ultimately transferred to storage 1010.

In some embodiments, communication interface 1006 is coupled to a network via communication interface 1006. Such communication can occur via Input/Output (I/O) device 1008. Still yet, the digital device 1000 may communicate with one or more networks such as a local area network (LAN), a general wide area network (WAN), and/or a public network (e.g., the Internet).

In some embodiments, input/output device 1008 is any device that inputs data (e.g., mouse, keyboard, stylus) or outputs data (e.g., speaker, display, virtual reality headset).

In some embodiments, storage 1010 can include computer system readable media in the form of volatile memory, such as read-only memory (ROM) and/or cache memory. Storage 1010 may further include other removable/non-removable, volatile/non-volatile computer system storage media. By way of example only, storage 1010 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 1012 by one or more data media interfaces. As will be further depicted and described below, storage 1010 may include at least one program product having a set (e.g., at least one) of program modules that are configured to carry out the functions. In some embodiments, RAM 1004 is found within storage 1010.

Program/utility, having a set (at least one) of program modules may be stored in storage 1010 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein. A module may be hardware (e.g., ASIC, circuitry, and/or the like), software, or a combination of both.

It should be understood that although not shown, other hardware and/or software components could be used in conjunction with the digital device 1000. Examples include, but are not limited to, microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband/or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a nontransitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made, and other embodiments may be used without departing from the broader scope of the present invention(s). Therefore, these and other variations upon the example embodiments are intended to be covered by the present invention(s).

The invention claimed is:
1. A computing system comprising:
one or more processors; and
memory storing instructions that, when executed by the one or more processors, cause the computing system to:
  receive text from content of a first web page at a first web site;
  determine a first title topic indicator based on the content of the first webpage, the first title topic indicator indicating a relationship between words in a title within the content of the first web page and text of a body in the content of the first web page;
  determine a first sentiment indicator based on the content of the first webpage, the first sentiment indicator indicating a degree of sentiment of the body of the content of the first web page;
  determine first text subjectivity indicator based on the content of the first webpage, the first text subjectivity indicator indicating subjectivity by comparing words and phrases from the content of the first web page to a database of known words and known phrases including known sentiment measures, the first text subjectivity indicator being based on the known sentiment measures;
  apply the first title topic indicator, the first sentiment indicator, and the first text subjectivity indicator to a credibility machine learning model to generate a first content credibility score and a first content bias score for the text of the first web page, the credibility machine learning model being trained on text from other web pages using known title topic indicators, known sentiment indicators, and known text subjectivity indicators, and known credibility scores and bias scores;
  generate a first graphical representation for the first content credibility score and the first bias credibility score indicating degrees of credibility and bias of the content of the first web page, respectively;
  provide the graphical representation to a first digital device that navigated to the first web page at the first website;
  receive a request from a third digital device, the request including a third web page identifier that identifies a third web page;
  if the system has previously stored a third content credibility score associated with the third web page, then provide the credibility score to the third digital device; and
  if the system has not previously stored a third content credibility score associated with the third web page; then:
    receive text from content of the third web page at a third website;
    determine a third title topic indicator based on the content of the third webpage, the third title topic indicator indicating a relationship between words in a title within the content of the third web page and text of a body in the content of the third web page;
    determine a third sentiment indicator based on the content of the third webpage, the third sentiment indicator indicating a degree of sentiment of the body of the content of the third web page;
    determine third text subjectivity indicator based on the content of the third webpage, the third text subjectivity indicator indicating subjectivity by comparing words and phrases from the content of the third web page to the database of known words and known phrases including known sentiment measures, the third text subjectivity indicator being based on the known sentiment measures;
    apply the third title topic indicator, the third sentiment indicator, and the third text subjectivity indicator to the credibility machine learning model to generate a third content credibility score;
    store the third credibility score associated with the third web page;
    receive a request from a fourth digital device, the requesting including the third web page identifier that identifies the third web page; and
    provide the third credibility score associated with the third web page to the fourth digital device.
2. The system of claim 1, wherein the memory storing instructions further cause the computing system to:
receive text from content of a second web page at a second web site, the second web site being served by a second web server that is remote from a first web server that serves the first web site;
determine a second title topic indicator based on the content of the second webpage, the second title topic indicator indicating a relationship between words in a title within the content of the second web page and text of a body in the content of the second web page;

determine a second sentiment indicator based on the content of the second webpage, the second sentiment indicator indicating a degree of sentiment of the body of the content of the second web page;

determine second text subjectivity indicator based on the content of the second webpage, the second text subjectivity indicator indicating subjectivity by comparing words and phrases from the content of the second web page to the database of known words and known phrases including known sentiment measures, the second text subjectivity indicator being based on the known sentiment measures;

apply the second title topic indicator, the second sentiment indicator, and the second text subjectivity indicator to the credibility machine learning model to generate a second content credibility score and a second content bias score for the text of the second web page;

generate a second graphical representation for the second content credibility score and the second bias credibility score indicating degrees of credibility and bias associated with the content of the second web page, respectively; and provide the graphical representation to a second digital device that navigated to the second web page at the second website.

3. The system of claim 1, wherein the memory storing instructions further cause the computing system to retrieve text from the content of the first web page, wherein the first title topic indicator, the first sentiment indicator, and the first text subjectivity indicator are determined based on the text of the content of the first web page.

4. The system of claim 1, wherein the memory storing instructions further cause the computing system to perform natural language processing on the text to, in part, identify sentences within the content of the first web page.

5. The system of claim 1, wherein determining the text subjectivity indicator comprises determining a measure of subjectivity for each of a plurality of sentences in the content of the first web page and the determining the text subjectivity indicator by averaging the measure of subjectivity for each of the plurality of sentences.

6. The system of claim 1, wherein the memory storing instructions further cause the computing system to perform optical character recognition to convert at least a portion of the content of the first web page into text.

7. The system of claim 1, wherein the memory storing instructions further cause the computing system to provide the third credibility score associated with the third web page to the third digital device.

8. The system of claim 1, wherein the memory storing instructions further cause the computing system to provide the third digital device an indication that the third web page has not been previously assessed.

9. The system of claim 8, wherein the third digital device is an advertisement server that may selects advertisements to be served to the third web page and the request including the third web page identifier is sent to the system prior to the advertisement server providing an advertisement to the third web page.

10. A non-transitory computer readable medium comprising instructions that, when executed, cause one or more processors to perform:

receiving text from content of a first web page at a first website;

determining a first title topic indicator based on the content of the first webpage, the first title topic indicator indicating a relationship between words in a title within the content of the first web page and text of a body in the content of the first web page;

determining a first sentiment indicator based on the content of the first webpage, the first sentiment indicator indicating a degree of sentiment of the body of the content of the first web page;

determining first text subjectivity indicator based on the content of the first webpage, the first text subjectivity indicator indicating subjectivity by comparing words and phrases from the content of the first web page to a database of known words and known phrases including known sentiment measures, the first text subjectivity indicator being based on the known sentiment measures;

applying the first title topic indicator, the first sentiment indicator, and the first text subjectivity indicator to a credibility machine learning model to generate a first content credibility score and a first content bias score for the text of the first web page, the credibility machine learning model being trained on text from other web pages using known title topic indicators, known sentiment indicators, and known text subjectivity indicators, and known credibility scores and bias scores;

generating a first graphical representation for the first content credibility score and the first bias credibility score indicating degrees of credibility and bias of the content of the first web page, respectively;

providing the graphical representation to a first digital device that navigated to the first web page at the first website;

receiving a request from a third digital device, the request including a third web page identifier that identifies a third web page;

if the system has previously stored a third content credibility score associated with the third web page, then providing the credibility score to the third digital device; and if the system has not previously stored a third content credibility score associated with the third web page, then:

receiving text from content of the third web page at a third website;

determining a third title topic indicator based on the content of the third webpage, the third title topic indicator indicating a relationship between words in a title within the content of the third web page and text of a body in the content of the third web page;

determining a third sentiment indicator based on the content of the third webpage, the third sentiment indicator indicating a degree of sentiment of the body of the content of the third web page;

determining a third text subjectivity indicator based on the content of the third webpage, the third text subjectivity indicator indicating subjectivity by comparing words and phrases from the content of the third web page to the database of known words and known phrases including known sentiment measures, the third text subjectivity indicator being based on the known sentiment measures;

applying the third title topic indicator, the third sentiment indicator, and the third text subjectivity indicator to the credibility machine learning model to generate a third content credibility score;

storing the third credibility score associated with the third web page;

receiving a request from a fourth digital device, the requesting including the third web page identifier that identifies the third web page; and providing the third credibility score associated with the third web page to the fourth digital device.

11. The non-transitory computer readable medium of claim 10, wherein the instructions further cause the one or more processors to perform:

receiving text from content of a second web page at a second web site, the second web site being served by a second web server that is remote from a first web server that serves the first web site;

determining a second title topic indicator based on the content of the second webpage, the second title topic indicator indicating a relationship between words in a title within the content of the second web page and text of a body in the content of the second web page;

determining a second sentiment indicator based on the content of the second webpage, the second sentiment indicator indicating a degree of sentiment of the body of the content of the second web page;

determining second text subjectivity indicator based on the content of the second webpage, the second text subjectivity indicator indicating subjectivity by comparing words and phrases from the content of the second web page to the database of known words and known phrases including known sentiment measures, the second text subjectivity indicator being based on the known sentiment measures;

applying the second title topic indicator, the second sentiment indicator, and the second text subjectivity indicator to the credibility machine learning model to generate a second content credibility score and a second content bias score for the text of the second web page;

generating a second graphical representation for the second content credibility score and the second bias credibility score indicating degrees of credibility and bias associated with the content of the second web page, respectively; and providing the graphical representation to a second digital device that navigated to the second web page at the second website.

12. The non-transitory computer readable medium of claim 10, wherein the instructions further cause the one or more processors to perform retrieving text from the content of the first web page, wherein the first title topic indicator, the first sentiment indicator, and the first text subjectivity indicator are determined based on the text of the content of the first web page.

13. The non-transitory computer readable medium of claim 10, wherein the instructions further cause the one or more processors to perform natural language processing on the text to, in part, identify sentences within the content of the first web page.

14. The non-transitory computer readable medium of claim 10, wherein determining the text subjectivity indicator comprises determining a measure of subjectivity for each of a plurality of sentences in the content of the first web page and the determining the text subjectivity indicator by averaging the measure of subjectivity for each of the plurality of sentences.

15. The non-transitory computer readable medium of claim 10, wherein the instructions further cause the one or more processors to perform optical character recognition to convert at least a portion of the content of the first web page into text.

16. The non-transitory computer readable medium of claim 10, wherein the instructions further cause the one or more processors to perform providing the third credibility score associated with the third web page to the third digital device.

17. The non-transitory computer readable medium of claim 10, wherein the instructions further cause the one or more processors to perform providing the third digital device an indication that the third web page has not been previously assessed.

18. The non-transitory computer readable medium of claim 17, wherein the third digital device is an advertisement server that may selects advertisements to be served to the third web page and the request including the third web page identifier is sent to the system prior to the advertisement server providing an advertisement to the third web page.

* * * * *